United States Patent
Lopes et al.

(10) Patent No.: US 11,565,545 B2
(45) Date of Patent: Jan. 31, 2023

(54) VEHICLE WHEEL DISC, VEHICLE WHEEL INCLUDING SUCH A WHEEL DISC AND METHOD FOR PRODUCING SUCH A WHEEL DISC AND VEHICLE WHEEL

(71) Applicant: Maxion Wheels U.S.A. LLC, Novi, MI (US)

(72) Inventors: Carlos Eduardo Lopes, Novi, MI (US); Fernando Toshihiko Mitsuyassu, Novi, MI (US)

(73) Assignee: Maxion Wheels U.S.A. LLC, Novi, MI (US)

( * ) Notice: Subject to any disclaimer, the term of this patent is extended or adjusted under 35 U.S.C. 154(b) by 813 days.

(21) Appl. No.: 16/325,804

(22) PCT Filed: Aug. 16, 2017

(86) PCT No.: PCT/US2017/047081
§ 371 (c)(1),
(2) Date: Feb. 15, 2019

(87) PCT Pub. No.: WO2018/035194
PCT Pub. Date: Feb. 22, 2018

(65) Prior Publication Data
US 2021/0379927 A1  Dec. 9, 2021

Related U.S. Application Data

(60) Provisional application No. 62/375,469, filed on Aug. 16, 2016.

(51) Int. Cl.
*B60B 3/00* (2006.01)
*B60B 3/02* (2006.01)
(Continued)

(52) U.S. Cl.
CPC .............. *B60B 3/005* (2013.01); *B60B 3/004* (2013.01); *B60B 3/008* (2013.01); *B60B 3/02* (2013.01);
(Continued)

(58) Field of Classification Search
CPC ......... B60B 3/004; B60B 3/005; B60B 3/007; B60B 3/008; B60B 3/02; B60B 3/04; B60B 3/044; B60B 3/06; B60B 3/10
(Continued)

(56) References Cited

U.S. PATENT DOCUMENTS

| 4,319,785 A | 3/1982 | Sato et al. |
| D408,343 S * | 4/1999 | Sacco .......................... D12/209 |

(Continued)

FOREIGN PATENT DOCUMENTS

| JP | 2004509809 A | 4/2004 |
| JP | 2004359045 A | 12/2004 |

(Continued)

OTHER PUBLICATIONS

JP Office Action, Application No. 2019506510, dated Jun. 26, 2021.
(Continued)

*Primary Examiner* — Jason R Bellinger
(74) *Attorney, Agent, or Firm* — MacMillan, Sobanski & Todd, LLC

(57) ABSTRACT

A wheel disc includes a wheel mounting portion defining a wheel axis, a plurality of spokes radially extending from the wheel mounting portion, and a rim junction on at least one spoke of the plurality of spokes. The rim junction is at an end of the at least one spoke opposite the wheel mounting portion. A first portion of the rim junction extends in an axial direction. Second and third portions of the rim junction extend in a circumferential direction. The axial direction is
(Continued)

parallel to the wheel axis and the circumferential direction is in a plane perpendicular to the wheel axis.

17 Claims, 18 Drawing Sheets

(51) Int. Cl.
  *B60B 3/04* (2006.01)
  *B60B 3/06* (2006.01)
  *B60B 3/10* (2006.01)
  B60B 1/08 (2006.01)
  B60B 1/14 (2006.01)
(52) U.S. Cl.
  CPC ............... *B60B 3/044* (2013.01); *B60B 3/06* (2013.01); *B60B 3/10* (2013.01); *B60B 1/08* (2013.01); *B60B 1/14* (2013.01); *B60B 2310/202* (2013.01); *B60B 2360/104* (2013.01)
(58) Field of Classification Search
  USPC .......................................... D12/204, 206, 209
  See application file for complete search history.

(56) References Cited

U.S. PATENT DOCUMENTS

| | | | |
|---|---|---|---|
| D408,345 S * | 4/1999 | Cullen | D12/209 |
| D431,515 S * | 10/2000 | Donikoglu | D12/209 |
| D431,516 S * | 10/2000 | Kaucher | D12/209 |
| D489,308 S * | 5/2004 | Tirado | D12/209 |
| 6,877,820 B2 * | 4/2005 | Langgartner | B60B 1/08 |
| | | | 301/64.102 |
| D508,885 S * | 8/2005 | Marji | D12/209 |
| 7,059,685 B2 | 6/2006 | Kermelk et al. | |
| D526,264 S * | 8/2006 | Marji | D12/209 |
| D526,609 S * | 8/2006 | Hosoi | D12/209 |
| D604,683 S * | 11/2009 | Hosai | D12/209 |
| D617,711 S * | 6/2010 | Lamm | D12/209 |
| 7,895,752 B2 * | 3/2011 | Sano | B21D 53/268 |
| | | | 29/894.325 |
| 7,984,551 B2 * | 7/2011 | McCorry | B60B 3/04 |
| | | | 29/894.323 |
| 8,646,851 B2 | 2/2014 | Kihara et al. | |
| D720,271 S * | 12/2014 | Mielke | D12/209 |
| 9,555,663 B2 * | 1/2017 | Yu | B60B 3/12 |
| 11,084,323 B2 * | 8/2021 | Mitsuyassu | B60B 3/10 |
| 2003/0080608 A1 * | 5/2003 | Coleman | B21D 53/265 |
| | | | 301/63.103 |
| 2010/0289323 A1 | 11/2010 | Sano et al. | |
| 2011/0316324 A1 | 12/2011 | Kihara et al. | |
| 2012/0291283 A1 | 11/2012 | Ikeda et al. | |
| 2013/0140874 A1 | 6/2013 | Fukaya | |
| 2014/0159469 A1 | 6/2014 | Chinavare et al. | |
| 2015/0102656 A1 | 4/2015 | Goto et al. | |

FOREIGN PATENT DOCUMENTS

| | | | | |
|---|---|---|---|---|
| JP | 2010208635 | A | 9/2010 | |
| JP | 2012040947 | A | 3/2012 | |
| WO | 2010107008 | A1 | 9/2010 | |
| WO | WO-2014029600 | A1 * | 2/2014 | ............... B60B 3/10 |
| WO | 2014145565 | A1 | 9/2014 | |
| WO | 2017117351 | A1 | 7/2017 | |
| WO | 2018035194 | A1 | 2/2018 | |

OTHER PUBLICATIONS

Brazilian Preliminary Office Action, Application No. BR112019003041-7, dated Jul. 27, 2021.
Intellectual Property India, Examination Report under Sections 12 & 13 of the Patent Act, 1970 and the Patents Rules, 2003, Application No. 201947008291, dated Sep. 16, 2021.
PCT International Search Report and Written Opinion, Application No. PCT/US2017/047081, dated Oct. 25, 2017.
A supplementary European search report, Application No. 17842039.4, dated Mar. 17, 2020.
First Chinese Office Action, Application No. 201780050164.7, dated Dec. 15, 2021.
Korean Office Action, Application No. 10-2019-7007528, dated Dec. 20, 2021.

* cited by examiner

VEHICLE WHEEL DISC, VEHICLE WHEEL INCLUDING SUCH A WHEEL DISC AND METHOD FOR PRODUCING SUCH A WHEEL DISC AND VEHICLE WHEEL

BACKGROUND OF THE INVENTION

The present invention relates generally to a vehicle wheel disc and vehicle wheel and in particular to an improved wheel disc, vehicle wheel including such a wheel disc and method for producing such a wheel disc and vehicle wheel.

Wheels for automotive vehicles may be produced from light weight metals to reduce a weight of the wheels. For example, the vehicle wheels may be produced from aluminum or alloys thereof. The weight of such wheels may be further reduced by removing mass—e.g., material—from the wheels. However, removing mass from the wheel also reduces stiffness and rigidity of the wheel. When the stiffness and rigidity of the wheel are reduced, performance for the wheel may be compromised. Thus, it would be desirable to remove mass from the wheel without a reduction in stiffness and rigidity.

SUMMARY OF THE INVENTION

The present invention relates to an improved wheel disc, vehicle wheel including such a wheel disc and method for producing such a wheel disc and vehicle wheel as illustrated and/or described herein.

According to one embodiment, the wheel disc and vehicle wheel including such a wheel disc may comprise, individually and/or in combination, one or more of the following features, elements, or advantages: (1) a "jet tail" shaped rim junction that provides additional stiffness to an associated spoke and improves a connection between the associated spoke and a wheel rim of the vehicle wheel; (2) bridge junctions between adjacent pairs of spokes that provide additional rigidity to the vehicle wheel, wherein the bridge junctions can have a uniform thickness, a varied thickness, and/or can be omitted to provide a single larger opening in the wheel, wherein the independent spokes connected by the bridge junctions reduce a weight of the vehicle wheel without reducing performance, and wherein inboard sides of the bridge junctions can have high thicknesses to avoid casting problems and can be later machined off; (3) hub pockets extending from an inboard side of a wheel mounting surface, wherein the hub pockets are deep and open, and reduce the weight of the vehicle wheel without reducing performance; (4) hub pocket openings in sidewalls of the hub pockets; (5) an outer ring of the wheel mounting portion that defines the hub pocket openings, or the outer ring may be omitted; (6) spoke pockets in the spokes, wherein the spoke pockets have a high/elevated and hollow varied section, and reduce weight and provide additional stiffness to the spokes; (7) nut pockets that are deep and provide additional stiffness to the spokes; (8) spoke start sections that have an increased height to provide additional stiffness to the spokes; (9) a rim offset distance to provide additional stiffness to the vehicle wheel; (10) flexibility to cast the wheel disc with the wheel rim to produce a lighter weight, one piece cast aluminum vehicle wheel or, alternatively, to produce a separately formed wheel disc (formed from any suitable material), and then secure it to a separately formed wheel rim (formed from any suitable material, which can be the same as that of the wheel disc or different), to reduce the weight of the fabricated vehicle wheel; (11) ability to maintain a high wheel offset and also provide adequate brake clearance; and (12) any limitations on the casting of the wheel disc on any portion(s) of it can be assured/compensated for by added inboard/outboard (i.e., backside/frontside) thickness during casting, wherein the added material can be later machined off to provide the desired final weight of the wheel disc and thus, the vehicle wheel including such a wheel disc.

According to another embodiment, the wheel disc and vehicle wheel including such a wheel disc may comprise, individually and/or in combination, one or more of the following features, elements, or advantages: A wheel disc comprising a wheel mounting portion with a wheel axis, a plurality of spokes radially extending from the wheel mounting portion, and a rim junction on at least one spoke of the plurality of spokes. The rim junction is at an end of the at least one spoke opposite the wheel mounting portion. A first portion of the rim junction extends in an axial direction. Second and third portions of the rim junction extend in a circumferential direction. The axial direction is parallel to the wheel axis and the circumferential direction is in a plane perpendicular to the wheel axis.

According to another embodiment, the wheel disc and vehicle wheel including such a wheel disc may comprise, individually and/or in combination, one or more of the following features, elements, or advantages: A vehicle wheel comprises a wheel rim and a wheel disc. The wheel rim and wheel disc are each formed from a suitable material. The wheel disc is configured to be secured to the wheel rim. The wheel disc has a wheel mounting portion with a wheel axis, a plurality of spokes radially extending from the wheel mounting portion, and a rim junction on at least one spoke of the plurality of spokes. The rim junction is between at least one spoke of the plurality of spokes and the wheel rim. A first portion of the rim junction extends in an axial direction. Second and third portions of the rim junction extend in a circumferential direction. The axial direction is parallel to the wheel axis and the circumferential direction is in a plane perpendicular to the wheel axis. The at least one spoke has a radially extending spoke pocket. The spoke pocket has a spoke pocket depth. A first end of the spoke pocket is adjacent the wheel mounting portion and a second end of the spoke pocket is adjacent the rim junction. The spoke pocket depth decreases between the first and second ends.

According to another embodiment, the wheel disc and vehicle wheel including such a wheel disc may comprise, individually and/or in combination, one or more of the following features, elements, or advantages: A vehicle wheel comprises a wheel rim and wheel disc. The wheel rim and wheel disc are each formed from a suitable material. The wheel disc is configured to be secured to the wheel rim. The wheel disc has a wheel mounting portion having a wheel axis, a plurality of spokes radially extending from the wheel mounting portion, a plurality of circumferentially spaced lug bolt receiving holes in the wheel mounting portion, and at least one hub pocket in the wheel mounting portion. The at least one hub pocket extends in the axial direction into the wheel mounting portion from an inboard face of the wheel disc, is interspaced between two lug bolt receiving holes of the plurality of lug bolt receiving holes, and has a bottom wall. An inner ring of the wheel mounting portion, the bottom wall, and the two lug bolt receiving holes define the at least one hub pocket. A sidewall of the at least one hub pocket is between the two lug bolt receiving holes. The sidewall extends in the axial direction, is a radially outward extent of the wheel mounting portion, and further defines the at least one hub pocket. A hub pocket opening is in the sidewall.

One or more potential and/or realized advantage(s) of an embodiment of the wheel disc and vehicle wheel including the wheel disc includes a reduction in mass without a reduction in rigidity and stiffness. Other advantages of this invention will become apparent to those skilled in the art from the following detailed description of the invention and preferred embodiments, when read in light of the accompanying drawings.

DETAILED DESCRIPTION OF THE INVENTION

Figure 1:
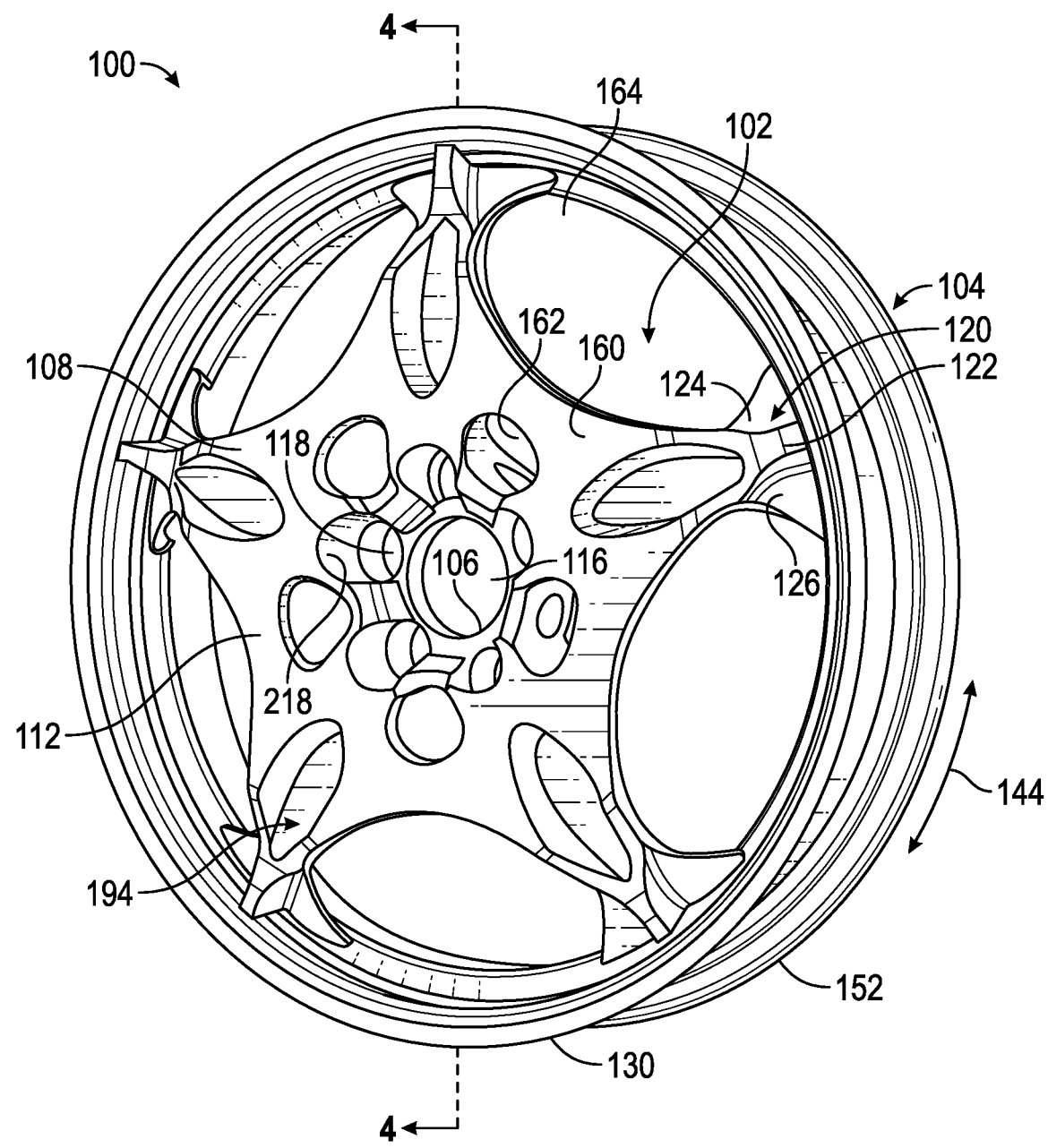
FIG. 1 is a perspective view of a first embodiment of a vehicle wheel and wheel disc in accordance with the present invention.

Referring now to the drawings, there is illustrated in FIGS. 1-7 a first embodiment of a vehicle wheel, indicated generally at 100. The vehicle wheel 100 comprises an "inner" wheel disc or front face portion, indicated generally at 102 and a "full" wheel rim, indicated generally at 104. Although the invention is illustrated and described in conjunction with the particular vehicle wheel construction disclosed herein, it will be appreciated that the invention can be used in conjunction with other types of vehicle wheel constructions.

As illustrated, the wheel disc 102 and wheel rim 104 are unitarily or monolithically produced—e.g., as a single casting. Alternatively, the wheel disc 102 and wheel rim 104 may be produced separately—e.g., as separate castings and/or non-castings—and then joined together by suitable means, to produce a "fabricated" vehicle wheel 100. Preferably, the vehicle wheel 100 is produced by a single casting is formed from aluminum or alloys thereof. Alternatively, the vehicle wheel 100 may be formed from any suitable material. As non-limiting examples, the vehicle wheel 100 (i.e., one or both of the wheel disc 102 and wheel rim 104), may be formed integrally (i.e., as a single unit) or formed as separate components and secured together by suitable means, and may be formed from similar materials and/or different materials including but not limited to, aluminum, magnesium, titanium or alloys thereof, steel, carbon fiber and/or composite materials.

Figure 4:
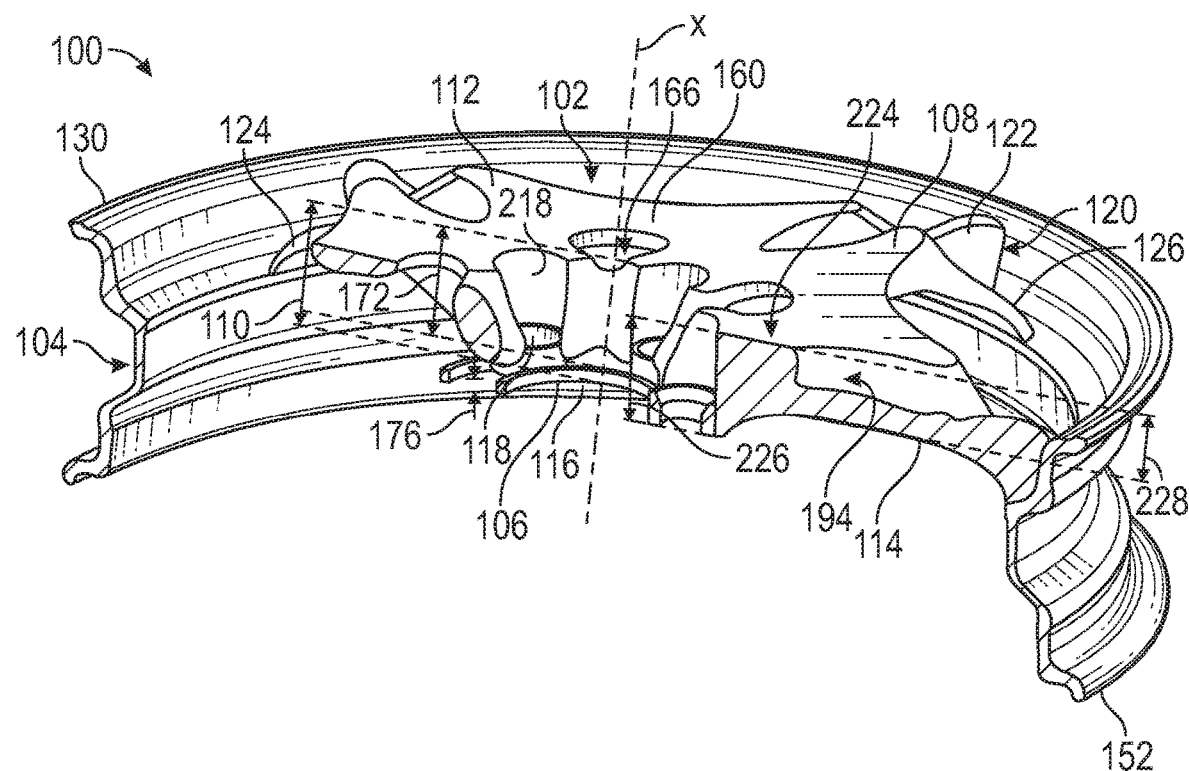
FIG. 4 is a section view taken along line 4-4 of FIG. 1.

The illustrated wheel disc 102 defines a wheel axis X (shown in FIG. 4). The wheel disc 102 includes a generally centrally located wheel mounting portion or hub portion 106 and a plurality of spokes 108 outwardly extending from the wheel mounting portion 106. The wheel mounting portion 106 has a wheel mounting portion height 110. The wheel disc 102 has opposite outboard and inboard faces 112 and 114, respectively.

In the illustrated embodiment, the wheel disc 102 includes five of such spokes 108 which are shown as being formed integral with the wheel mounting portion 106 and the wheel rim 104. Alternatively, the number of the spokes 108 may be other than illustrated if so desired. For example, the vehicle wheel 100 may include less than five spokes 108 or more than five spokes 108. Alternatively, the spokes 108 may be individually formed and secured to the wheel rim 104 and the wheel mounting portion 106 by suitable means and the wheel rim 104 may be formed integral with one another but separate from the wheel mounting portion 106 of and joined thereto by a suitable method.

In the illustrated embodiment, the wheel mounting portion 106 is provided with a centrally located pilot aperture or hub hole 116. The pilot aperture 116 extends along the wheel axis X. Circumferentially spaced around the pilot aperture 116 (in the wheel mounting portion 106) are a plurality of lug bolt receiving holes 118. In the illustrated embodiment, the wheel mounting portion 106 includes five lug bolt receiving holes 118, which are preferably provided in the wheel mounting portion 106 radially "in line" with a respective one of each of the spokes 108. Alternatively, the number and/or location of the lug bolt receiving holes 118 may be other than illustrated if so desired. The lug bolt receiving holes 118 receive lug bolts (not shown) for securing the vehicle wheel 100 with nuts (not shown) on an axle (not shown) of an associated vehicle.

Figure 2:
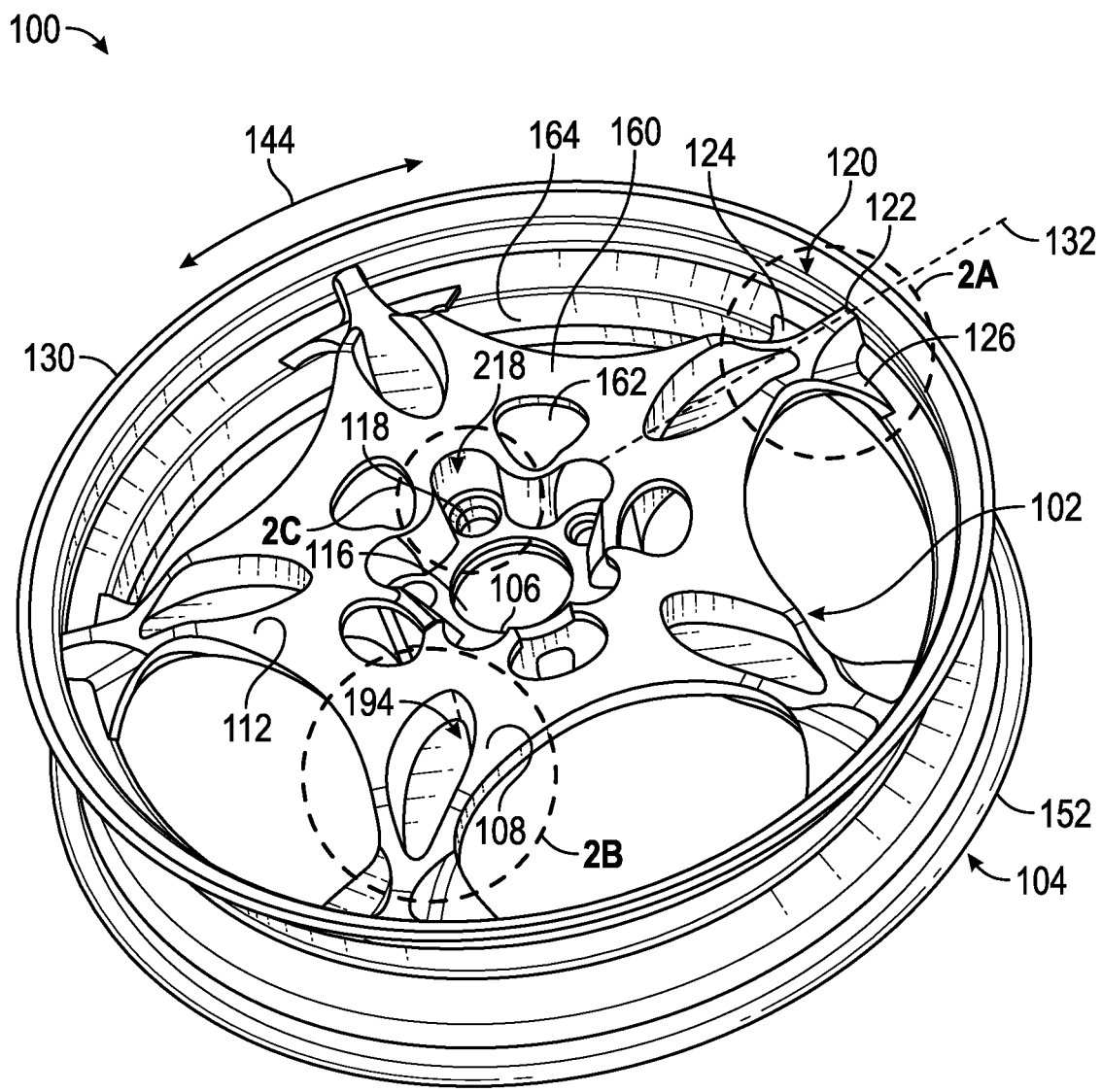
FIG. 2 is an additional perspective view of the vehicle wheel of FIG. 1.
Figure 2A:
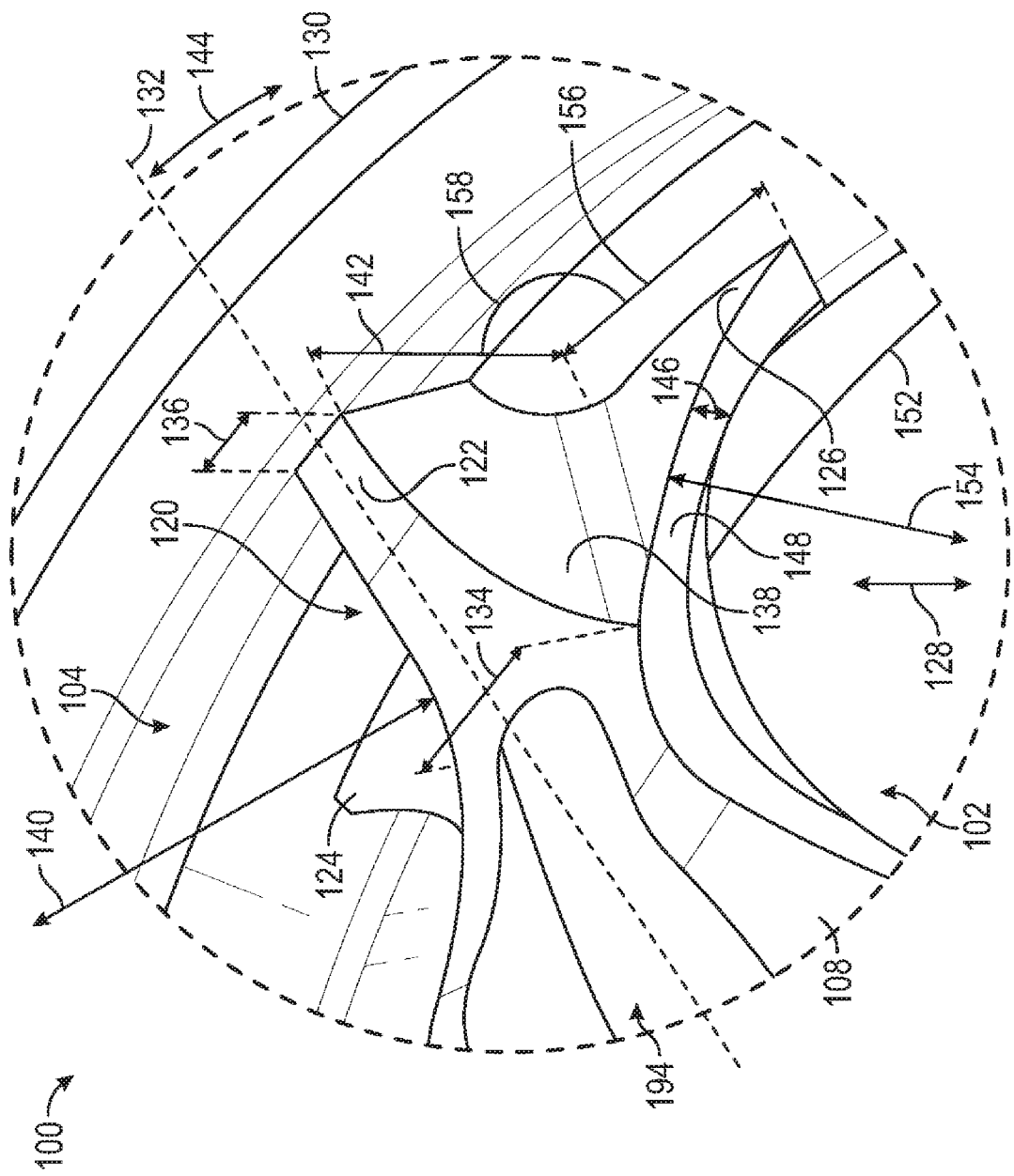
FIG. 2A is a first enlarged portion of FIG. 2 showing a rim junction.

"Jet tail" or "raised T-shape" rim junctions, indicated generally at 120 and best shown in FIG. 2A, connect, secure, or otherwise join the spokes 108 to the wheel rim 104. As such, the rim junctions 120 are at ends of the spokes 108 opposite the wheel mounting portion 106. As non-limiting examples, the "jet tail" or "raised T-shape" rim junctions 120 provide additional stiffness to the associated spokes 108 and for the connections between the spokes 108 and the wheel rim 104. The rim junctions 120 have first, second, and third portions or tails 122, 124, and 126, respectively.

The first portions 122 extend in an axial direction 128, wherein the axial direction 128 is parallel to the wheel axis X. As illustrated, the first portions 122 extend in the axial direction 128 from the spokes 108 and towards an outboard edge 130 of the wheel rim 104. The outboard edge 130 is an edge of the wheel rim 104 outboard from the vehicle upon which the vehicle wheel 100 is secured. Alternatively, the rim junction 120 may be "inverted" from the configuration shown—e.g., the first portions 122 may extend towards an inboard edge 152 instead of the outboard edge 130. The inboard edge 152 is an edge of the wheel rim 104 inboard to the vehicle upon which the vehicle wheel 100 is secured. Furthermore, the inboard edge 152 is opposite the outboard edge 130 on the wheel rim 104. As illustrated, the first portions 122 are symmetric about spoke centerlines 132 of the spokes 108, wherein the spoke centerlines 132 radially extend from the wheel mounting portion 106 to the wheel rim 104. Alternatively, the first portions 122 may be other than symmetric about the spoke centerlines 132.

The first portions 122 have first thicknesses 134 at an end closest to the wheel mounting portion 106 and second thicknesses 136 at the wheel rim 104. The first and second thicknesses 134 and 136, respectively, are measured transversely to the spoke centerlines 132. As illustrated, the second thicknesses 136 are less than the first thicknesses 134. Alternatively, the second thicknesses 136 may be greater than the first thicknesses 134 or the first and second thicknesses 134 and 136, respectively, may be equal. Preferably, for a 19×4.5 one piece cast aluminum wheel, the first thicknesses 134 are comprised within the range from 10 millimeters to 30 millimeters and the second thicknesses 136 are comprised within the range from 5 millimeters to 50 millimeters. More preferably, the first thicknesses 134 are comprised within the range from 10 millimeters to 30 millimeters and the second thicknesses 136 are comprised within the range from 5 millimeters to 30 millimeters. Each of the first portions 122 may have the same first and second thicknesses 134 and 136, respectively. Alternatively, one or more of the first portions 122 may have a different first or second thickness 134 or 136, respectively. Also, all ranges used herein are for the above size and type of vehicle wheel so it is apparent for other sizes and/or types of vehicle wheels the "ranges" may be other than described.

The first portions 122 also have curved surfaces 138 between the first and second thicknesses 134 and 136, respectively. The curved surfaces 138 extend generally in the axial direction 128 and have first radiuses 140. The first radiuses 140 may be constant or varied. Preferably, the first radiuses 140 are comprised within the range from 8 millimeters to 100 millimeters. More preferably, the first radiuses 140 are comprised within the range from 8 millimeters to 30 millimeters. Each of the first portions 122 may have the same first radiuses 140. Alternatively, one or more of the first portions 122 may have a different first radius 140. Alternatively, the first portions 122 may have planar surfaces or otherwise shaped surfaces between the first and second thicknesses 134 and 136, respectively.

The first portions 122 have junction heights 142 in the axial direction 128 at the wheel rim 104. The junction heights 142 are preferably greater than the second thicknesses 136. Preferably, the junction heights 142 are comprised within the range from 10 millimeters to 100 millimeters. More preferably, the junction heights 142 are comprised within the range from 10 millimeters to 40 millimeters. Each of the first portions 122 may have the same junction height 142. Alternatively, one or more of the first portions 122 may have a different junction height 142.

The second and third portions 124 and 126, respectively, are opposing across the spoke centerline 132. As illustrated, the second and third portions 124 and 126, respectively, are preferably symmetric with each other across the spoke centerlines 132. As such, discussion of one of the second or third portions 124 or 126, respectively, also applies to the others of the second or third portions 124 or 126, respectively. Alternatively, the second and third portions 124 and 126, respectively, may be other than symmetric with each other across the spoke centerlines 132.

As illustrated, the second and third portions 124 and 126, respectively, extend in a circumferential direction 144 from the spokes 108 to the wheel rim 104, wherein the circumferential direction 144 follows a circumference or perimeter of a circle around the wheel axis X. The circle is in a plane preferably perpendicular to the wheel axis X and has the wheel axis X at the center of the circle. Preferably, the second and third portions 124 and 126, respectively, are curved and also extend in the axial direction 128 from the spokes 108 to the wheel rim 104—i.e., the second and third portions 124 and 126, respectively, preferably extend in both the circumferential direction 144 and the axial direction 128. Alternatively, the second and third portions 124 and 126, respectively, may extend only in the circumferential direction 144 from the spokes 108 to the wheel rim 104.

The second and third portions 124 and 126, respectively, have third thicknesses 146. As illustrated, the third thicknesses 146 are preferably less than both the first and second thicknesses 134 and 136, respectively. Alternatively, the third thicknesses 146 may be equal to the first or second thicknesses 134 or 136, respectively, greater than one or both of the first or second thicknesses 134 or 136, respectively, or greater than one and less than the other of the first and second thicknesses 134 and 136, respectively. Preferably, the third thicknesses 146 are comprised within the range from 5 millimeters to 30 millimeters. More preferably, the third thicknesses 146 are comprised within the range from 5 millimeters to 15 millimeters. Each of the second and third portions 124 and 126, respectively, may have the same third thickness 146. Alternatively, one or more of the second or third portions 124 or 126, respectively, may have a different third thickness 146.

The second and third portions 124 and 126, respectively, preferably have curved edges 148 between the spokes 108 and wheel rim 104. The curved edges 148 have second radiuses 150. The second radiuses 150 may be constant or varied. Preferably, the second radiuses 150 are comprised within the range from 10 millimeters to 100 millimeters. More preferably, the second radiuses 150 are comprised within the range from 10 millimeters to 60 millimeters. Each of the second and third portions 124 and 126, respectively, may have the same second radius 150. Alternatively, one or more of the second or third portions 124 or 126, respectively, may have a different second radius 150. Alternatively, the second and third portions 124 and 126, respectively, may have planar faces or otherwise shaped surfaces between the spokes 108 and wheel rim 104.

Furthermore, the second and third portions 124 and 126, respectively, extend from the spokes 108 towards the inboard edge 152 of the wheel rim 104. The second and third portions 124 and 126, respectively, curve towards the inboard edge 152 at third radiuses 154. Preferably, the third radiuses 154 are comprised within the range from 10 millimeters to 50 millimeters. More preferably, the third radiuses 154 are comprised within the range from 10 millimeters to 30 millimeters. Each of the second and third portions 124 and 126, respectively, may have the same third radius 154. Alternatively, one or more of the second or third portions 124 or 126, respectively, may have a different third radius 154. Alternatively, the second and third portions 124 and 126, respectively, may extend towards the inboard edge 152 with planar or otherwise shaped surfaces.

The second and third portions 124 and 126, respectively, have junction lengths 156 extending in the circumferential direction 144 at the wheel rim 104. The junction lengths 156 are preferably greater than the third thicknesses 146. As illustrated, the junction lengths 156 are also preferably greater than the junction heights 142. Alternatively, the junction lengths 156 may be less than or equal to the junction heights 142. Preferably, the junction lengths 156 are comprised within the range from 5 millimeters to 50 millimeters. More preferably, the junction lengths 156 are comprised within the range from 5 millimeters to 35 millimeters. Each of the second and third portions 124 and 126, respectively, may have the same junction length 156. Alternatively, one or more of the second or third portions 124 or 126, respectively, may have a different junction length 156.

As illustrated, an angle 158 at the wheel rim 104 between the first portions 122 and the second and third portions 124 and 126, respectively, is preferably substantially 90 degrees (illustrated as between the junction heights 142 and the junction lengths 156). Alternatively, the angle 158 may be other than 90 degrees. For example, the angle 158 may be greater than 90 degrees. As a non-limiting example, the angle 158 may be 120 degrees such that the first, second, and third portions 122, 124, and 126 are equally spaced circumferentially around the spokes 108.

As illustrated, the first portion 122 is a single member. Alternatively, the first portion 122 may be two members such that the rim junction 120 has a generally "X" shape with two first portions 122 extending towards the outboard edge 130 and the second and third portions 124 and 126, respectively, extending towards the inboard edge 152. Preferably, the two first portions 122 and the second and third portions 124 and 126, respectively, would be evenly spaced at 90 degrees. Alternatively, the two first portions 122 and the second and third portions 124 and 126, respectively, may be spaced at other than 90 degrees.

Bridge junctions 160 span between or otherwise connect adjacent spokes of the plurality of spokes 108. As a non-limiting example, the bridge junctions 160 provide additional rigidity between adjacent pairs of the spokes 108 and for the vehicle wheel 100. The bridge junctions 160 define first and second openings 162 and 164, respectively, in the wheel disc 102.

The bridge junctions 160 may have constant or varied thicknesses in the axial direction 128. Some of the bridge junctions 160 may have constant thicknesses while others of the bridge junctions 160 have varied thicknesses. The thicknesses of the bridge junctions 160 may vary between the bridge junctions 160 or within a single one of the bridge junctions 160. As a non-limiting example, the bridge junctions 160 may be produced with a constant thickness, then have material or structure machined away to vary the thicknesses.

Figure 7:
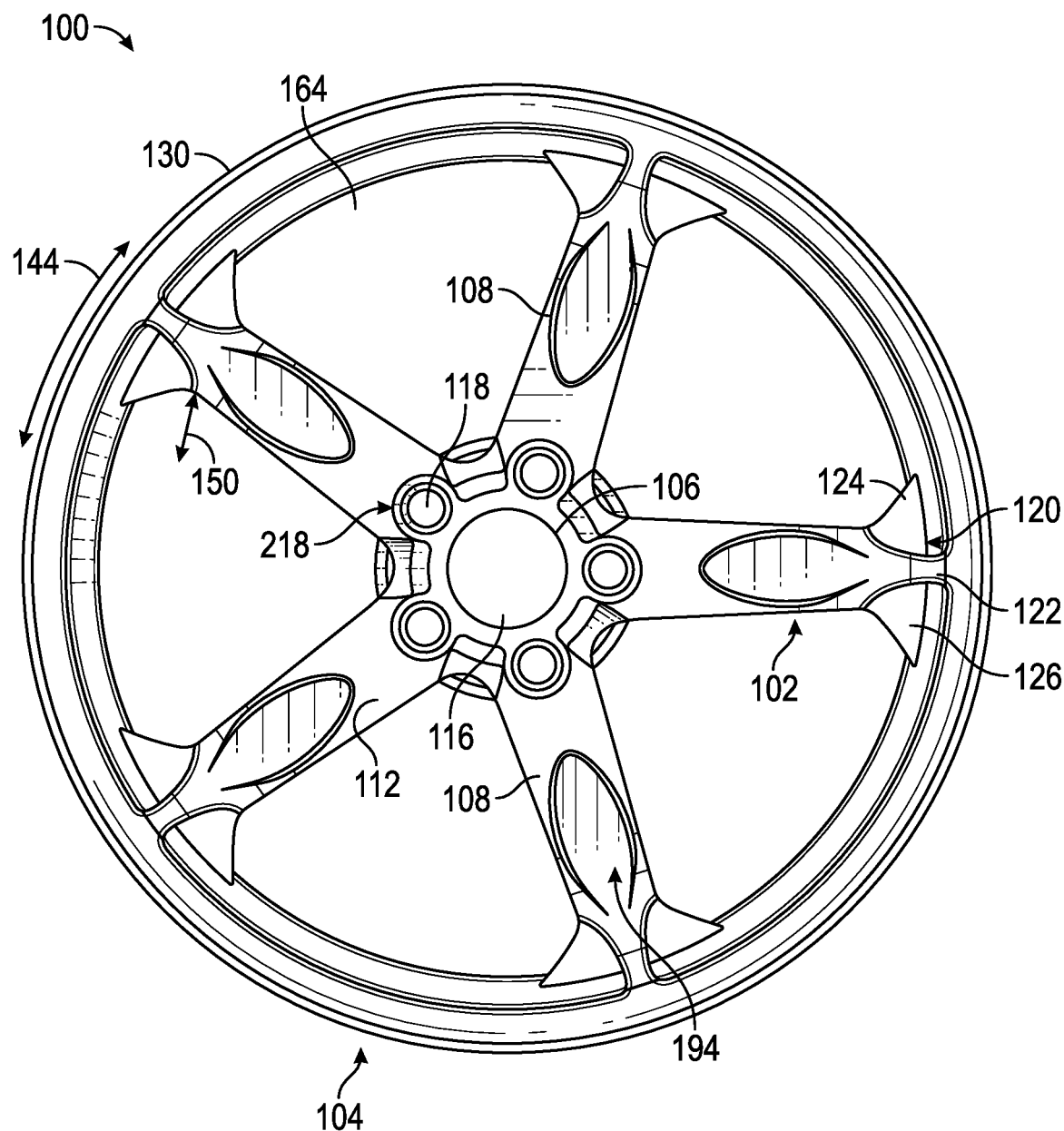
FIG. 7 is an elevation view of the vehicle wheel of FIG. 1 with bridging portions omitted.

Alternatively, as illustrated in FIG. 7, the bridge junctions 160 may be omitted from the wheel disc 102. When the bridge junctions 160 are omitted, only single, larger second openings 164 are provided in the wheel disc 102 between adjacent pairs of spokes 108.

Figure 3:
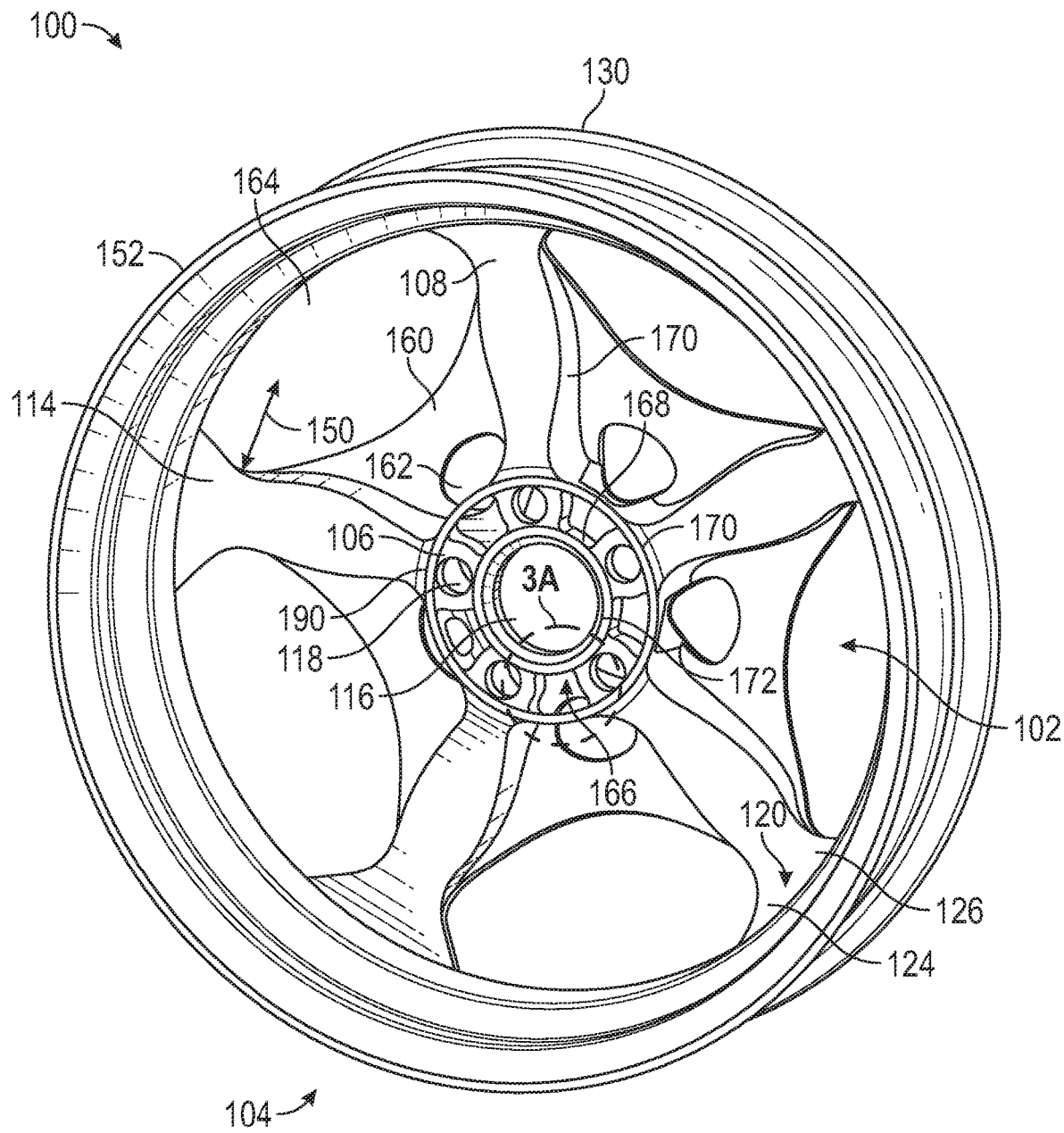
FIG. 3 is a perspective view showing an opposite side of the vehicle wheel of FIG. 1.
Figure 3A:
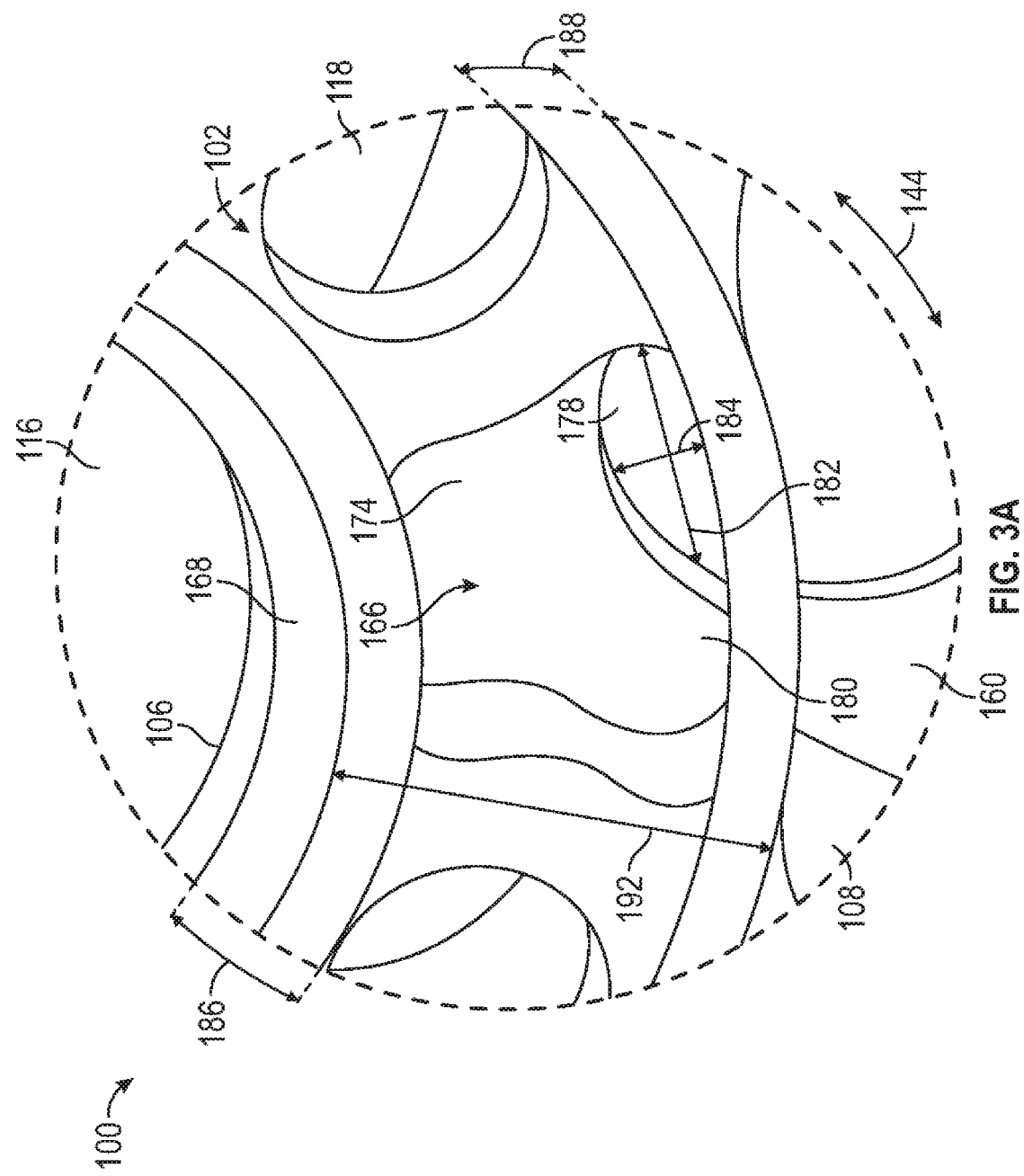
FIG. 3A is an enlarged portion of FIG. 3 showing a hub pocket.

A plurality of hub pockets, indicated at 166 and best shown in FIG. 3A, extend into the wheel mounting portion 106 from the inboard face 114. Preferably, the hub pockets 166 are both "deep" and open. As a non-limiting example, the hub pockets 166 reduce a weight of the vehicle wheel 100.

The hub pockets 166 are interspaced with the lug bolt receiving holes 118. As illustrated, there are five of the hub pockets 166. Alternatively, the wheel disc 102 may have fewer or greater than five of the hub pockets 166. As non-limiting examples, the hub pockets 166 may not be between every pair of the lug bolt receiving holes 118 or more than one hub pocket 166 may be between a pair of the lug bolt receiving holes 118. As illustrated, the hub pockets 166 are defined in the wheel mounting portion 106 by the lug bolt receiving holes 118 and coaxial inner and outer rings 168 and 170, respectively, of the wheel mounting portion 106.

The hub pockets 166 have hub pocket depths 172 (shown in FIG. 4). The hub pocket depths 172 are preferably less than the wheel mounting portion height 110. As such, the hub pockets 166 preferably have radially extending bottom walls 174. The bottom walls 174 define the hub pockets 166 such that they are not through openings in the axial direction 128. The hub pocket depths 172 are to the bottom walls 174.

As illustrated, the hub pocket depths 172 are preferably less than the wheel mounting portion height 110 by an inner ring height 176 of the inner ring 168. Alternatively, the hub pocket depths 172 may be less than the wheel mounting portion height 110 by other than the inner ring height 176. Preferably, the hub pocket depths 172 are comprised within the range from 10 millimeters to 60 millimeters. More preferably, the hub pocket depths 172 are comprised within the range from 10 millimeters to 45 millimeters. Each of the hub pockets 166 may have the same hub pocket depth 172. Alternatively, one or more of the hub pockets 166 may have a different hub pocket depth 172. Alternatively, the hub pockets 166 may be omitted from the wheel disc 102.

The hub pockets 166 preferably have hub pocket openings 178 in sidewalls 180 thereof, as best shown in FIG. 3A. The sidewalls 180 extend in the axial direction 128 and are a radially outward extent of the wheel mounting portion 106. The outer ring 170 aligns with or otherwise "caps" the sidewalls 180 on the inboard face 114. The hub pocket openings 178 have hub pocket opening widths 182 and heights 184. Each of the hub pocket openings 178 may have the same hub pocket opening width 182 and hub pocket height 184. Alternatively, one or more of the hub pocket openings 178 may have a different hub pocket width 182 or hub pocket height 184. Alternatively, the hub pocket openings 178 may be omitted from the wheel disc 102, if so desired.

The inner ring 168 has a predetermined thickness 186. Preferably, the inner ring thickness 186 is comprised within the range from 5 millimeters to 50 millimeters. The outer ring 170 has a thickness 188. Preferably, the outer ring thickness 188 is comprised within the range from 5 millimeters to 10 millimeters. As illustrated, the inner ring thickness 186 is greater than the outer ring thickness 188. Alternatively, the inner ring thickness 186 may be less than or equal to the outer ring thickness 188. The inner and outer rings 168 and 170, respectively, are generally perpendicular to the bottom walls 174 at the hub pockets 166.

As indicated at 190 in FIG. 3, the outer ring 170 is preferably tangential with, and spans between, the lug bolt receiving holes 118. Preferably, as shown in FIG. 3A, a distance 192 from a radially inner face of the inner ring 168 to a radially outer face of the outer ring 170 is comprised within the range from 10 millimeters to 50 millimeters.

More preferably, the distance 192 from a radially inner face of the inner ring 168 to a radially outer face of the outer ring 170 is comprised within the range from 10 millimeters to 35 millimeters. The outer ring 170 may be omitted from the wheel disc 102. As a non-limiting example, the weight of the vehicle wheel 100 is reduced by omitting the outer ring 170. When the outer ring 170 is omitted, the spokes 108 are connected by the bridge junctions 160 and the hub pockets 166 are defined in the wheel mounting portion 106 by the lug bolt receiving holes 118 and outer ring 170.

Figure 2B:
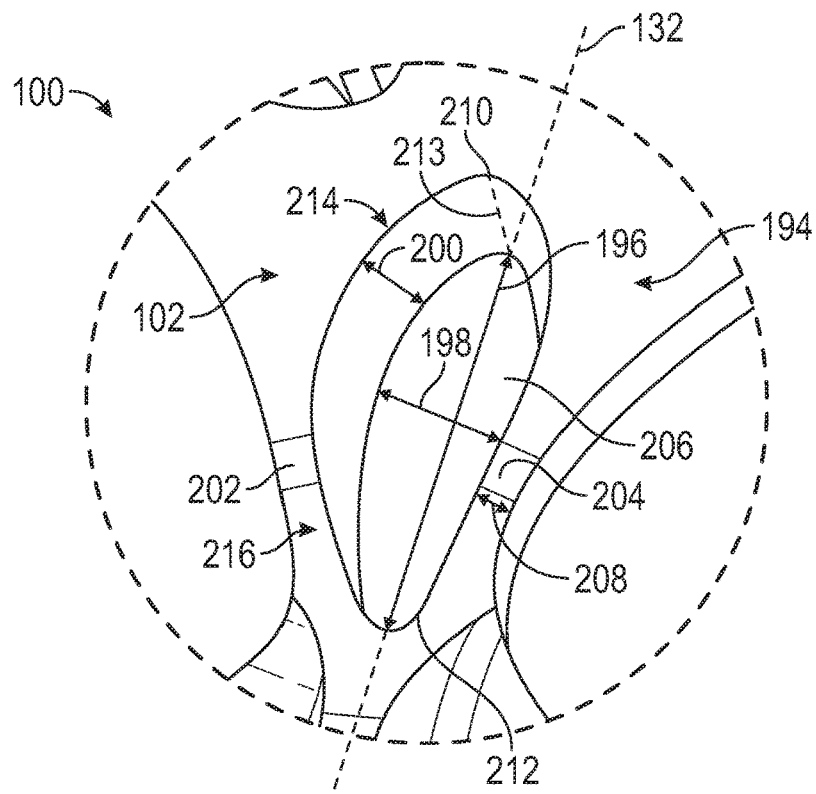
FIG. 2B is a second enlarged portion of FIG. 2 showing a spoke pocket.

Spoke pockets or recesses, indicated generally at 194 and best shown in FIG. 2B, preferably extend into the spokes 108 from the outboard face 112. Alternatively, the spoke pockets 194 may extend into the spokes 108 from the inboard face 114. As non-limiting examples, the spoke pockets 194 reduce the weight of the vehicle wheel 100 and provide additional stiffness for the spokes 108. Also, while only a single spoke pocket 194 is illustrated as being provided in each of the spokes 108, one or more of the spokes 108 may be provided with more than one spoke pocket 194 if so desired.

As illustrated, the spoke pockets 194 are preferably generally elliptically shaped in the outboard face 112. Alternatively, the spoke pockets 194 may be other than elliptically shaped. For example, the spoke pockets 194 may be of any desired shape, such as for example, round, rectangular or otherwise polygonally shaped. For example, the spoke pockets 194 may be defined by a series of lines, curves, or combinations of lines and curves in the outboard face 112. The spoke pockets 194 are preferably symmetric about the spoke centerlines 132 of the spokes 108. Alternatively, the spoke pockets 194 may be other than symmetric about the spoke centerlines 132 and/or omitted from the wheel disc 102.

The spoke pockets 194 have pocket lengths 196 which are preferably generally parallel to the spoke centerlines 132, pocket widths 198 transverse to the pocket lengths 196, and pocket depths 200 in the axial direction 128 and extending into the spokes 108. As illustrated, the pocket lengths 196 are preferably greater than the pocket widths 198. Alternatively, the pocket lengths 196 may be less than or equal to the pocket widths 198. As illustrated, the pocket widths 198 are greater than the pocket depths 200. Alternatively, the pocket widths 198 may be less than or equal to the pocket depths 200.

Preferably, the pocket lengths 196 are comprised within the range from 50 millimeters to 150 millimeters, the pocket widths 198 are comprised within the range from 20 millimeters to 60 millimeters, and the pocket depths 200 are comprised within the range from 5 millimeters to 50 millimeters. More preferably, the pocket lengths 196 are comprised within the range from 50 millimeters to 120 millimeters, the pocket widths 198 are comprised within the range from 20 millimeters to 45 millimeters, the pocket depths 200 are comprised within the range from 5 millimeters to 30 millimeters. Each of the spoke pockets 194 may have the same pocket length 196, pocket width 198, and pocket depth 200. Alternatively, one or more of the spoke pockets 194 may have a different pocket length 196, pocket width 198, and/or pocket depth 200.

The spoke pockets 194 are defined by first and second sidewalls 202 and 204, respectively. As illustrated, the first and second sidewalls 202 and 204 are preferably symmetric with each other across the spoke centerlines 132. Alternatively, the first and second sidewalls 202 and 204, respectively, may be other than symmetric with each other across the spoke centerlines 132. As illustrated, the first and second sidewalls 202 and 204, respectively, preferably slope inward towards each other as they extend into the spokes 108 from the outboard face 112. This results in the pocket widths 198 being greatest at the outboard face 112 and then decreasing to a least value at bottom surfaces 206. Alternatively, the pocket widths 198 may increase or remain constant from the outboard face 112 to the bottom surfaces 206.

The first and second sidewalls 202 and 204, respectively, have sidewall thicknesses 208. Preferably, the sidewall thicknesses 208 are comprised within the range from 5 millimeters to 20 millimeters. More preferably, the sidewall thicknesses 208 are comprised within the range from 5 millimeters to 15 millimeters. Each of the spoke pockets 194 may have the same sidewall thicknesses 208. Alternatively, one or more of the spoke pockets 194 may have a different sidewall thickness 208. Preferably, the sidewall thicknesses 208 are constant for the first and second sidewalls 202 and 204, respectively. Alternatively, the sidewall thickness 208 may vary for one or both of the first and second sidewalls 202 and 204, respectively. Alternatively, the first sidewalls 202 may have the sidewall thickness 208 and the second sidewalls 204 have a different sidewall thickness.

The pocket depths 200 preferably decrease as the spoke pockets 194 extend from first ends 210 adjacent to or otherwise near the wheel mounting portion 106 to second ends 212 adjacent to or otherwise near the wheel rim 104. The pocket depths 200 preferably decrease to zero or substantially zero at the second ends 212. As illustrated, the pocket depths 200 are preferably substantially constant in first regions, indicated generally at 214, until decreasing in second regions, indicated generally at 216. Alternatively, the pocket depths 200 may decrease at a constant or varied rate between the first and second ends 210 and 212, respectively. Alternatively, the pocket depths 200 may continually increase or vary between increasing and decreasing between the first and second ends 210 and 212, respectively.

While the pocket depths 200 decrease, the pocket bottom surfaces 206 preferably remain planar. Alternatively, one or more of the pocket bottom surfaces 206 may be other than planar.

As illustrated, the elliptical shapes of the spoke pockets 194 are preferably not continuous at the first ends 210. Instead, the first ends 210 preferably have creases 213 (indicated by dashed lines in FIG. 2B) or otherwise non-continuous points in the elliptical shapes. Alternatively, the elliptical shapes of the spoke pockets 194 may be continuous at the first ends 210.

Furthermore, the spoke pockets 194 may have varied sections (transverse to the spoke centerlines 132) between the first and second ends 210 and 212, respectively.

As illustrated, the spoke pockets 194 preferably extend from the outboard face 112 and into the spokes 108. Alternatively, one or more the spoke pockets 194, including all of the spoke pockets 194, may extend into the spokes 108 from the inboard face 114.

Figure 2C:
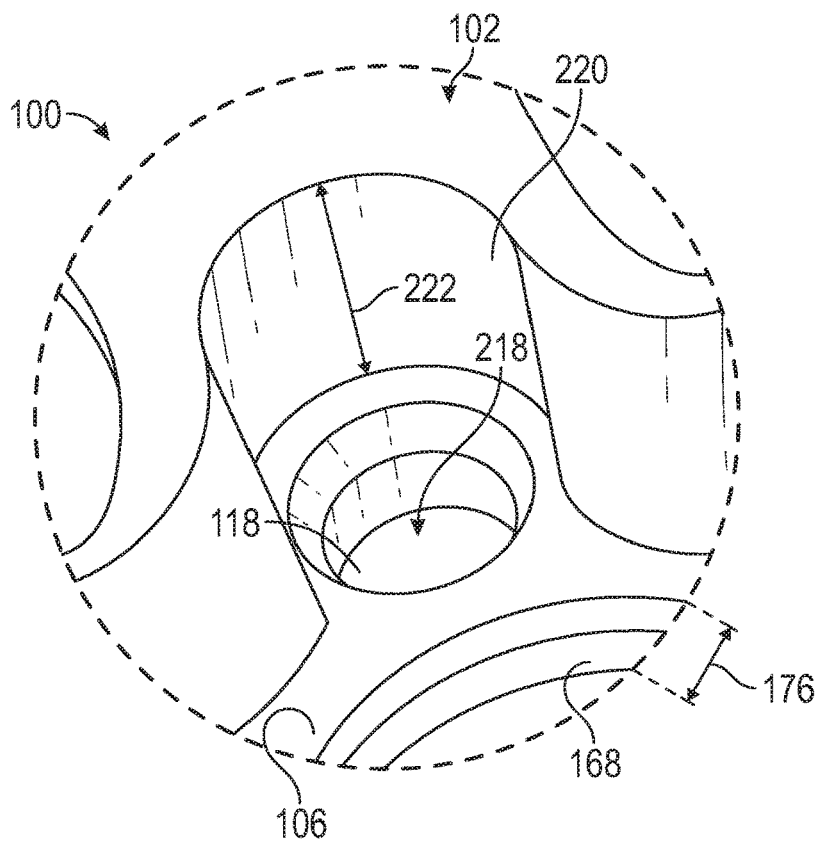
FIG. 2C is a third enlarged portion of FIG. 2 showing a nut pocket.

Nut pockets, indicated generally at 218 and best shown in FIG. 2C, preferably extend into the wheel mounting portion 106 from the outboard face 112 at the lug bolt receiving holes 118 such that nut pocket sidewalls 220 are formed. The nut pocket sidewalls 220 are preferably substantially parallel to the wheel axis X. The nut pockets 218 have depths 222. The nut pockets 218 are preferably "deep" nut pockets. As a non-limiting example, the nut pockets 218 provide additional stiffness to the spokes 108. Preferably, the nut pocket depths 222 are comprised within the range from 10 millimeters to 50 millimeters. More preferably, the nut pocket depths 222 are comprised within the range from 10 millimeters to 35 millimeters. Each of the nut pockets 218 may have the same nut pocket depth 222. Alternatively, one or more of the nut pockets 218 may have different nut pocket depths 222. Alternatively, the nut pockets 218 may be omitted from the wheel disc 102.

Spoke start portions, indicated generally at 224 and best shown in FIG. 4, are preferably located between the wheel mounting portion 106 and each of the spokes 108. Alternatively, the spoke start portions 224 may be located at less than each of the spokes 108. The spoke start portions 224 have a spoke start height 226 between the spokes 108 and wheel mounting portion 106. Preferably, and as illustrated, the spoke start height 226 is greater than a spoke height 228. As a non-limiting example, the spoke start portions 224 provide additional stiffness to the spokes 108. Preferably, the spoke start heights 226 are comprised within the range from 10 millimeters to 70 millimeters and the spoke heights 228 are comprised within the range from 10 millimeters to 50 millimeters. More preferably, the spoke start heights 226 are comprised within the range from 10 millimeters to 55 millimeters and the spoke heights 228 are comprised within the range from 10 millimeters to 35 millimeters. Each of the spoke start portions 224 may have the same spoke start height 226. Alternatively, one or more of the spoke start portions 224 may have a different spoke start height 226. Alternatively, the spoke start height 226 may be less than or equal to the spoke height 226, or the spoke start portion 224 may be omitted from the wheel disc 102.

Figure 5:
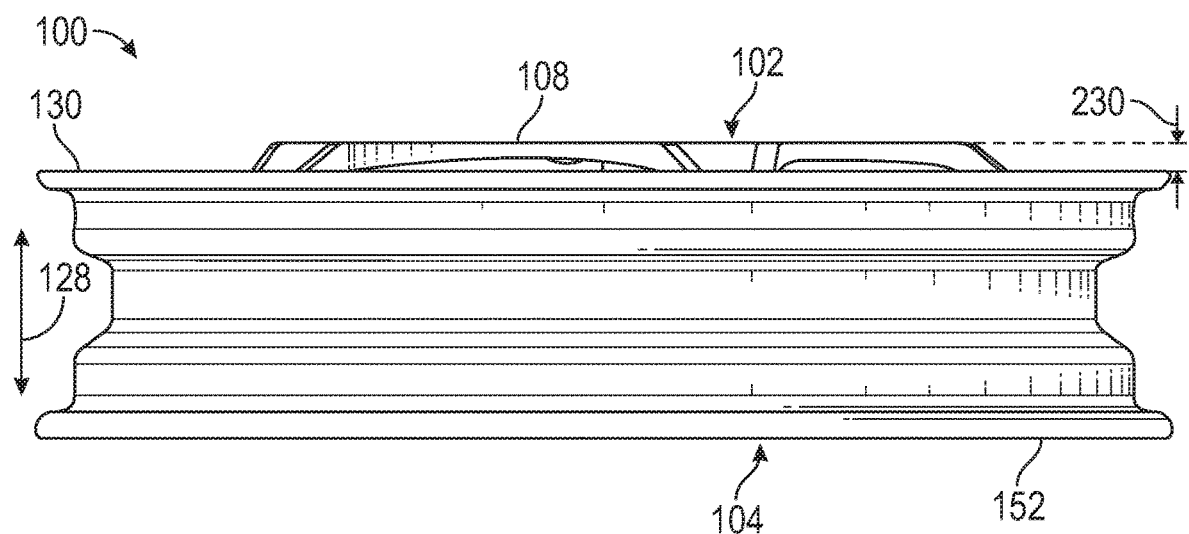
FIG. 5 is an elevation view of the vehicle wheel of FIG. 1.
Figure 6:
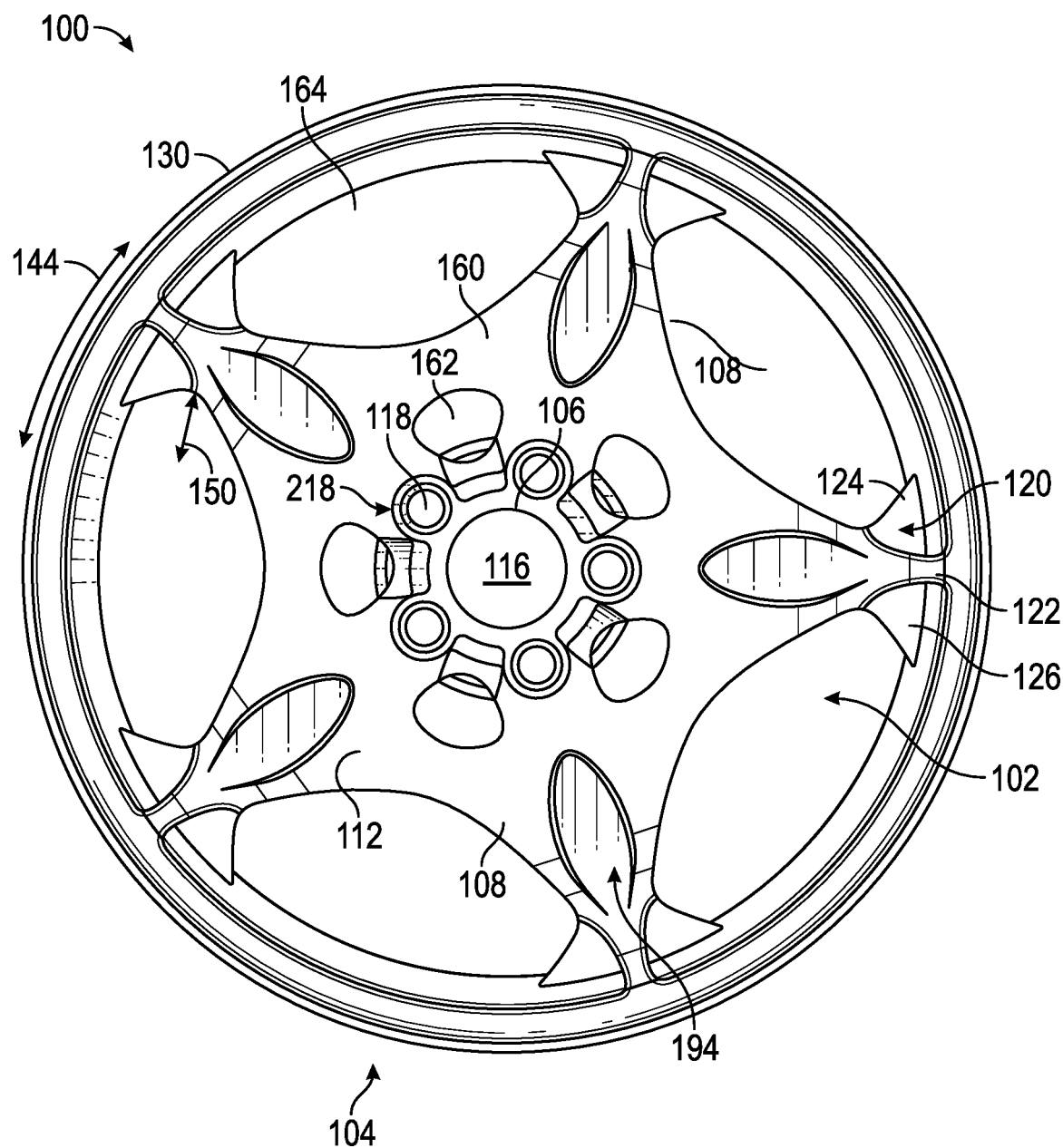
FIG. 6 is an additional elevation view of the vehicle wheel of FIG. 1.

As best shown in FIG. 5, the wheel disc 102—i.e., the outboard face 112 thereof—protrudes or otherwise extends outwardly by a rim offset distance 230 from the outboard edge 130 of the wheel rim 104. The rim offset distance 230 is a furthest extent or protrusion of the outboard face 112 of the wheel disc 102 from the wheel rim 104—i.e., portions of the outboard face 112 of the wheel disc 102 may be less than the rim offset distance 230 from the wheel rim 104 but preferably no portion of the outboard face 112 is further from the wheel rim 104 than the rim offset distance 230. As a non-limiting example, the rim offset distance 230 provides additional stiffness to the vehicle wheel 100. Preferably, the rim offset distance 230 is comprised within the range from 10 millimeters to 30 millimeters. More preferably, the rim offset distance 230 is comprised within the range from 10 millimeters to 20 millimeters. Alternatively, the outboard face 112 of the wheel disc 102 may not extend outwardly from the wheel rim 104—i.e., the rim offset distance 230 may be zero, less than zero, or otherwise omitted from the wheel disc 102.

Preferably, the wheel disc 102, and thus the vehicle wheel 100 with the wheel disc 102, have a high wheel offset and provide clearance for an associated vehicle brake—e.g., a disc, drum or drum-in-hat brake assembly.

Preferably, one or more of the rim junctions 120, bridge junctions 160, hub pockets 166, hub pocket openings 178, outer ring 170, spoke pockets 194, nut pockets 218, spoke start portions 224, rim offset distance 230, high wheel offset, brake clearance, and/or other features of the wheel disc 102 are preferably formed during the casting of the wheel disc 102 (or the vehicle wheel 100 with such a wheel disc 102). Any limitations of the casting can be compensated for by added material thickness during the casting—i.e., added material to the outboard and/or inboard faces 112 and/or 114 of the wheel disc 102, respectively. The added material thickness can later be machined off to form one or more of the rim junctions 120, bridge junctions 160, hub pockets 166, hub pocket openings 178, outer ring 170, spoke pockets 194, nut pockets 218, spoke start portions 224, rim offset distance 230, high wheel offset, brake clearance, and/or other features of the wheel disc 102.

Preferably, the vehicle wheel 100 includes at least the rim junctions 120, but one or more of the bridge junctions 160, hub pockets 166, hub pocket openings 178, outer ring 170, spoke pockets 194, nut pockets 218, spoke start portions 224, rim offset distance 230, monolithic or separate casting of the vehicle wheel 100 and wheel disc 102, high wheel offset, brake clearance, and/or other features discussed for the vehicle wheel 100 may be omitted. Alternatively, the rim junctions 120 may be omitted and the vehicle wheel 100 may comprise a combination of the bridge junctions 160, hub pockets 166, hub pocket openings 178, outer ring 170, spoke pockets 194, nut pockets 218, spoke start portions 224, rim offset distance 230, monolithic or separate casting of the vehicle wheel 100 and wheel disc 102, high wheel offset, brake clearance, and/or other features discussed for the vehicle wheel 100.

Figure 8:
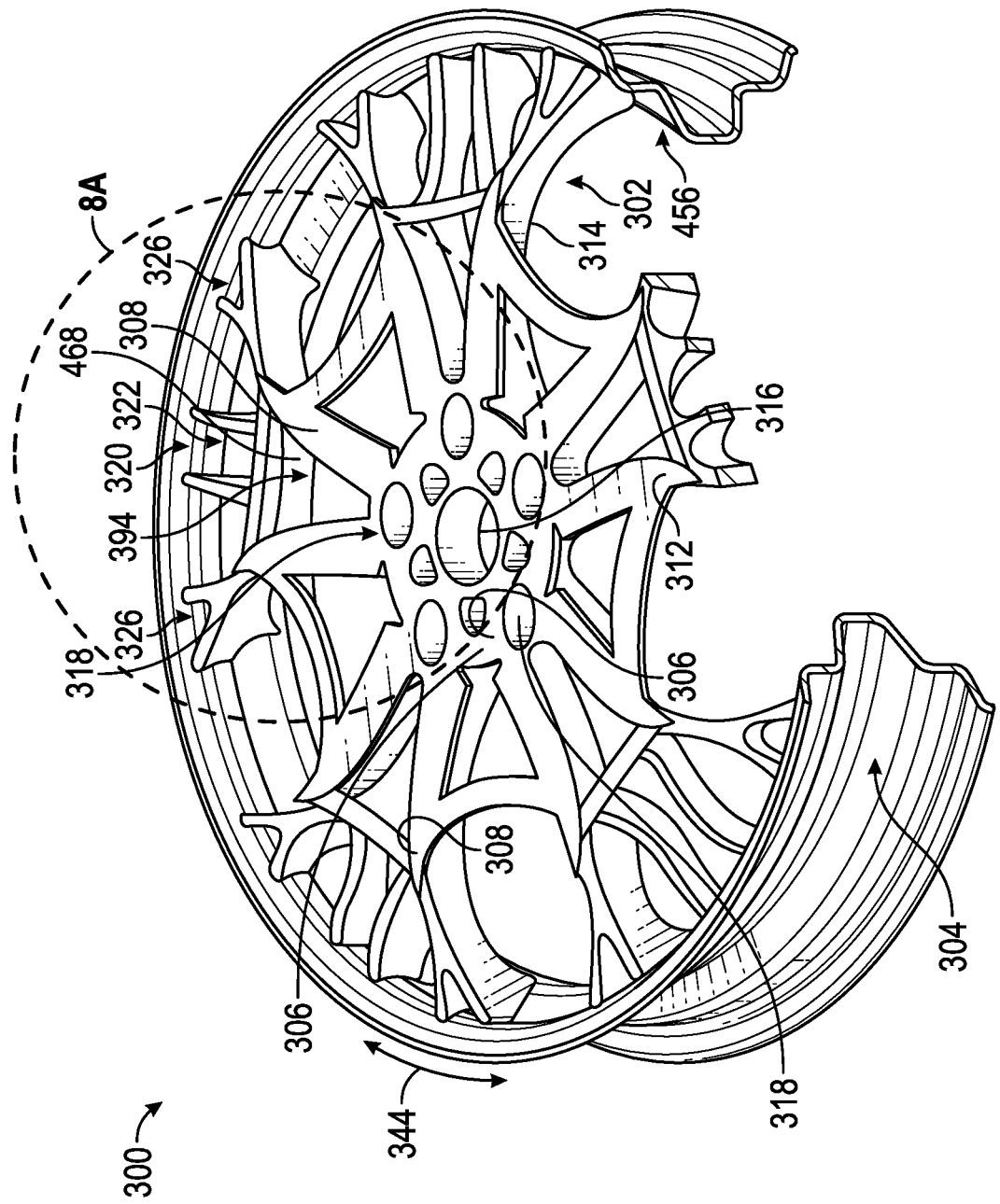
FIG. 8 is a partial perspective view of a second embodiment of a vehicle wheel and wheel disc in accordance with the present invention.
Figure 9:
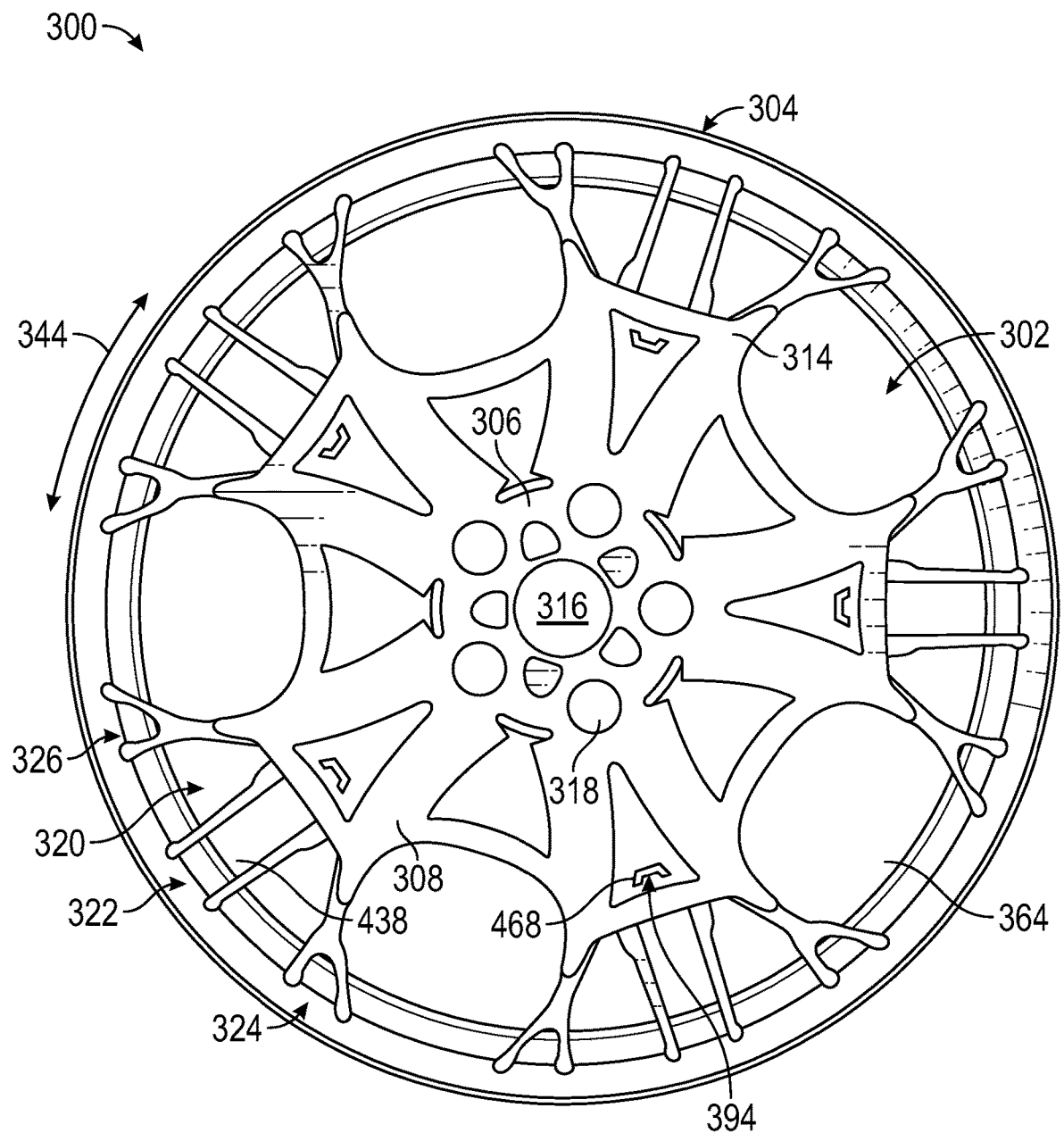
FIG. 9 is an elevation view of the vehicle wheel of FIG. 8.

Referring now to FIGS. 8 and 9, there is illustrated a second embodiment of a vehicle wheel, indicated generally at 300, in accordance with the present invention. Because the vehicle wheel 300 is a variation of the vehicle wheel 100 of FIGS. 1-7, like reference numerals, increased by 200, designate corresponding parts in the drawings and detailed description thereof will be omitted.

The vehicle wheel 300 has rim junctions 320 between spokes 308 and a wheel rim 304. The rim junctions 320 have first portions, indicated generally at 322, second portions, indicated generally at 324, and third portions, indicated generally at 326, connecting each of the spokes 308 to the wheel rim 304.

As illustrated, the first portions 322 are bifurcated into substantially parallel first and second forks 432 and 434, respectively. Alternatively, the first portions 322 may be a single fork. Alternatively, the first and second forks 432 and 434, respectively, may converge and/or diverge—i.e., be other than parallel—between the spokes 308 and the wheel rim 304.

The first and second forks 432 and 434, respectively, are separated by a distance 436 such that there are first portion openings 438 defined between the first and second forks 432 and 434, respectively. Preferably, the distance 436 is comprised within the range from 10 millimeters to 70 millimeters. More preferably, the distance 436 is comprised within the range from 10 millimeters to 50 millimeters. As illustrated, the first portion openings 438 are centered in a circumferential direction 344 on the centerlines 332. Alternatively, the first portion openings 438 may be other than centered in the circumferential direction 344 on the centerlines 332. Alternatively, the first portion openings 438 may be omitted.

In the circumferential direction 344, the first forks 432 have first thicknesses 440 and the second forks 434 has second thicknesses 442. Preferably, the first and second thicknesses 440 and 442, respectively, are equal. Alternatively, the first thicknesses 440 may be greater or less than the second thicknesses 442. Preferably, the first thicknesses 440 are comprised within the range from 10 millimeters to 50 millimeters. More preferably, the first thicknesses 440 are comprised within the range from 10 millimeters to 30 millimeters. Each of the first and second forks 432 and 434, respectively, may have the same first and second thicknesses 440 and 442, respectively. Alternatively, one or more of the first or second forks 432 or 434, respectively, may have a different first or second thickness 440 or 442, respectively.

As illustrated, the first and second thicknesses 440 and 442, respectively, are substantially constant between the spokes 308 and the wheel rim 304. Alternatively, one or both of the first and second thicknesses 440 and 442, respectively, may vary between the spokes 308 and the wheel rim 304. For example, the first and/or second thicknesses 440 and/or 442, respectively, may increase or decrease between the spokes 308 and the wheel rim 304.

The first forks 432 further have first heights 444 and the second forks 434 further have second heights 446, both in the axial direction 328. Preferably, the first and second heights 444 and 446, respectively, are equal. Alternatively, the first heights 444 may be greater or less than the second heights 446. Preferably, the first heights 444 are comprised within the range from 10 millimeters to 50 millimeters. More preferably, the first heights 444 are comprised within the range from 10 millimeters to 35 millimeters. Each of the first and second forks 432 and 434, respectively, may have the same first and second heights 444 and 446, respectively. Alternatively, one or more of the first or second forks 432 or 434 may have a different first or second height 444 or 446, respectively.

As illustrated, the first and second heights 444 and 446, respectively, are substantially constant between the spokes 308 and the wheel rim 304. Alternatively, one or both of the first and second heights 444 and 446, respectively, may vary between the spokes 308 and the wheel rim 304. For example, the first and/or second heights 444 and 446, respectively, may increase or decrease between the spokes 308 and the wheel rim 304.

Preferably, the first heights 444 are substantially greater than the first thicknesses 440 and the second heights 446 are substantially greater than the second thicknesses 442. As a result, the first portions 322 extend more in the axial direction 318 328 than in the circumferential direction 344. Alternatively, the first heights 444 may be other than substantially greater than the first thicknesses or less than or equal to the first thicknesses 440 and the second heights 446 may be other than substantially greater than the second thicknesses 442 or less than or equal to the second thicknesses 442. As non-limiting examples, the first and second forks 432 and 434, respectively, provide additional stiffness in the axial direction 318 between the spokes 308 and the wheel rim 304.

The second and third portions 324 and 326, respectively, are also each bifurcated into third and fourth forks 448 and 450, respectively (the third and fourth forks 448 and 450, respectively, being symmetric across the spoke centerlines 332). Alternatively, the second and third portions 324 and 326, respectively, may be other than bifurcated. Alternatively, one of the second and third portions 324 and 326, respectively, may not be bifurcated while the others of the second and third portions 324 and 326, are bifurcated. Preferably, the third and fourth forks 448 and 450, respectively, diverge from each other as they extend from the spokes 308 to the wheel rim 304. Alternatively, the third and fourth forks 448 and 450, respectively, may be parallel or converge from the spokes 308 to the wheel rim 304.

Figure 8A:
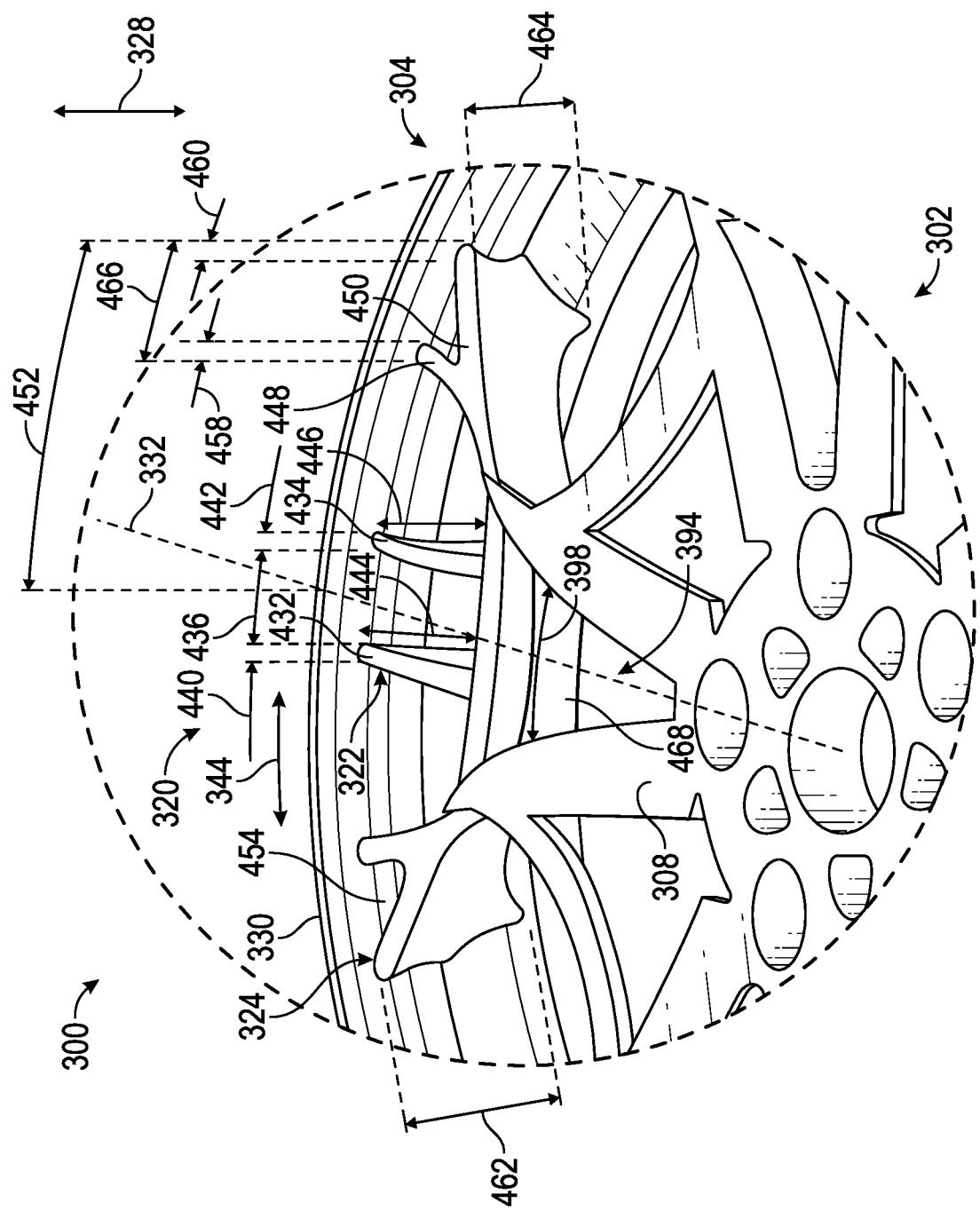
FIG. 8A is an enlarged portion of FIG. 8 showing a rim junction and a spoke pocket.

Furthermore, the second and third portions 324 and 326, respectively, diverge from the spoke centerlines 332 and each other. The second and third portions 324 and 326, respectively, each have divergence distances 452 from the spoke centerlines 332 to their furthest points from the spoke centerlines 332 (for example, the furthest point of the third portion 326 is the rightmost point of the fourth fork 450 when viewing FIG. 8A). Preferably, the divergence distances 452 are substantially greater than the first and second heights 444 and 446, respectively. As a non-limiting example, the divergence distances 452 provide additional stiffness between the spokes 308 and the wheel rim 304 in the circumferential direction 344. Preferably, the divergence distances 452 are comprised within the range from 100 millimeters to 180 millimeters. More preferably, the divergence distances 452 are comprised within the range from 100 millimeters to 160 millimeters.

The diverging configuration of the third and fourth forks 448 and 450, respectively, define recesses or openings 454 between the third and fourth forks 448 and 450, respectively. A rim profile, indicated generally at 456 of the wheel rim 304 closes or otherwise blocks the recesses 454 such that the recesses 454 are not through openings extending between an outboard face 312 and an inboard face 314. Alternatively, the rim profile 456 may be such that the recesses 454 are through openings from the outboard face 312 to the inboard face 314.

The third forks 448 have third thicknesses 458 and the fourth forks 450 have fourth thicknesses 460, both in the circumferential direction 344. Preferably, the third and fourth thicknesses 458 and 460, respectively, are equal. Alternatively, the third thicknesses 458 may be greater or less than the fourth thicknesses 460. Preferably, the third thicknesses 458 are comprised within the range from 5 millimeters to 20 millimeters and the fourth thicknesses 460 are comprised within the range from 5 millimeters to 20 millimeters. More preferably, the third thicknesses 458 are comprised within the range from 5 millimeters to 15 millimeters and the fourth thicknesses 460 are comprised within the range from 5 millimeters to 15 millimeters. Alternatively, one or more of the third or fourth forks 448 or 450, respectively, may have a different third or fourth thickness 458 or 460, respectively.

As illustrated, the third and fourth thicknesses 458 and 460, respectively, are substantially constant between the spokes 308 and the wheel rim 304. Alternatively, one or both of the third and fourth thicknesses 458 and 460, respectively, may be other than constant between the spokes 308 and the wheel rim 304. For example, the third or fourth thicknesses 458 and 460, respectively, may increase or decrease between the spokes 308 and the wheel rim 304.

The third forks 448 further have third heights 462 and the fourth forks 450 further have fourth heights 464, both in the axial direction 328. Preferably, the third and fourth heights 462 and 464, respectively, are equal at corresponding positions along the third and fourth forks 448 and 450, respectively. Alternatively, the third heights 462 may be greater or less than the fourth heights 464 at corresponding positions along the third and fourth forks 448 and 450, respectively. Preferably, the third heights 462 are comprised within the range from 10 millimeters to 60 millimeters. More preferably, the third heights 462 are comprised within the range from 10 millimeters to 45 millimeters. Each of the third and fourth forks 448 and 450, respectively, may have the same third and fourth heights 462 and 464, respectively. Alternatively, one or more of the third or fourth forks 448 or 450, respectively, may have a different third or fourth height 462 or 464, respectively.

As illustrated, the third and fourth heights 462 and 464, respectively, increase from the spokes 308 to the wheel rim 304. Alternatively, one or both of the third and fourth heights 462 and 464, respectively, may be constant or decreasing between the spokes 308 and the wheel rim 304.

Preferably, the third heights 462 are substantially greater than the third thicknesses 458 and the fourth heights 464 are substantially greater than the fourth thicknesses 460. As a result, the second and third portions 324 and 326, respectively, extend in the circumferential direction 344 substantially more than in the axial direction 328. The second and third portions 324 and 326, respectively, extend in the circumferential direction 326 for a span distance 466. Alternatively, the third heights 462 may be other than substantially greater than the third thicknesses 458 or less than or equal to the third thicknesses 458 and the fourth heights 464 may be other than substantially greater than the fourth thicknesses 460 or less than or equal to the fourth thicknesses 460. As non-limiting examples, the third and fourth forks 448 and 450, respectively, provide additional stiffness in the circumferential direction 344 between the spokes 308 and the wheel rim 304.

The divergence distances 452 are substantially greater than the third and fourth heights 462 and 462, respectively. Alternatively, the divergence distances 452 may be other than substantially greater than the third and fourth heights 462 and 464, respectively.

Preferably and as illustrated, the first, second, third, and fourth heights 444, 446, 462, and 464, respectively, are equal. Alternatively, one or more of the first, second, third, or fourth heights 444, 446, 462, or 464, respectively, may be different from the others.

Each of the spokes 308 has a spoke pocket 394 with a spoke pocket opening 468 through the wheel disc 302 from the outboard face 312 to the inboard face 314. Furthermore, the spoke pockets 394 have a generally triangular shape in the outboard face 312. Pocket widths 398 of the spoke pockets 394 increase from a wheel mounting portion 306 to the wheel rim 304.

Figure 10:
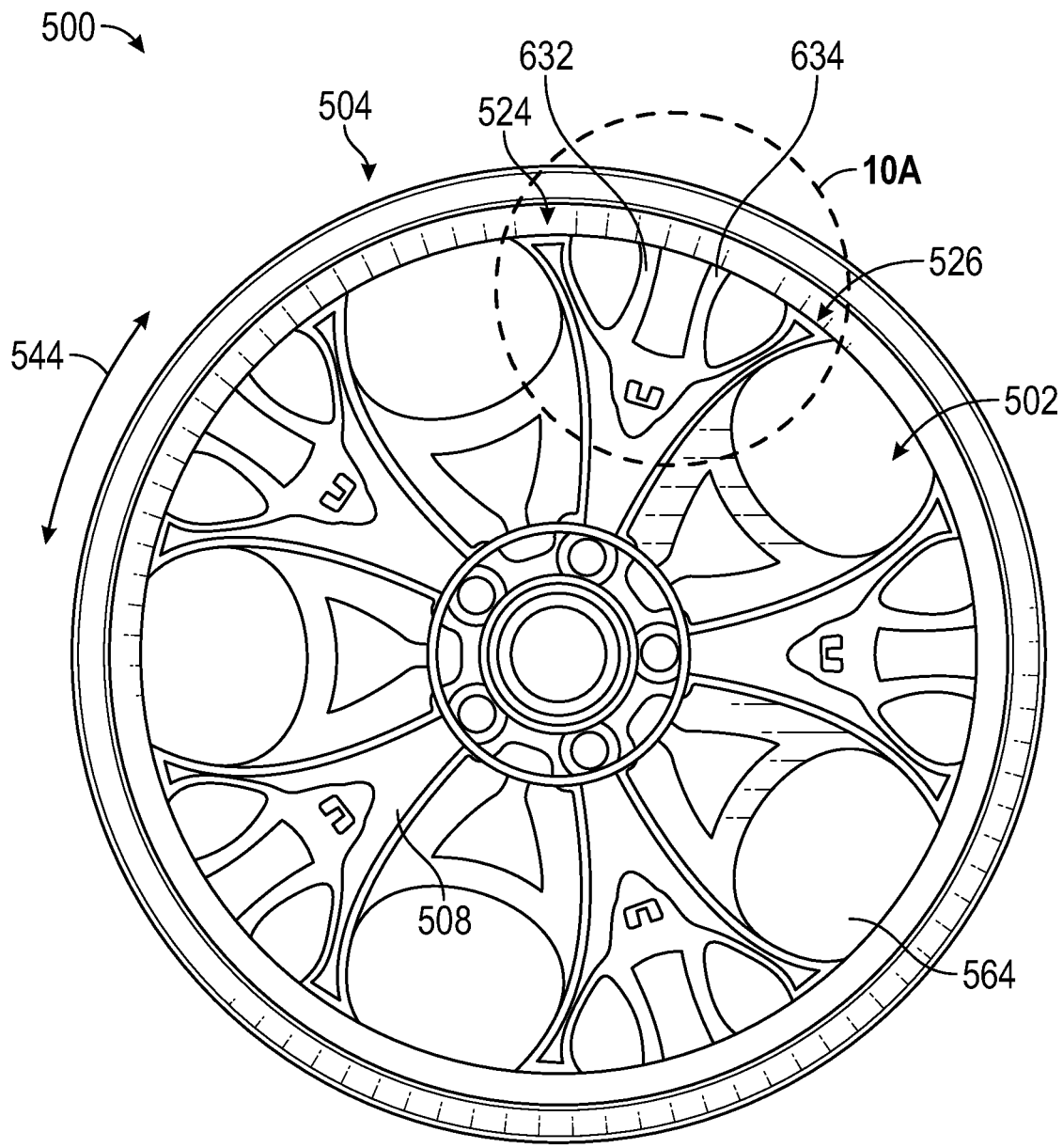
FIG. 10 is an elevation view of a third embodiment of a vehicle wheel and wheel disc in accordance with the present invention.
Figure 10A:
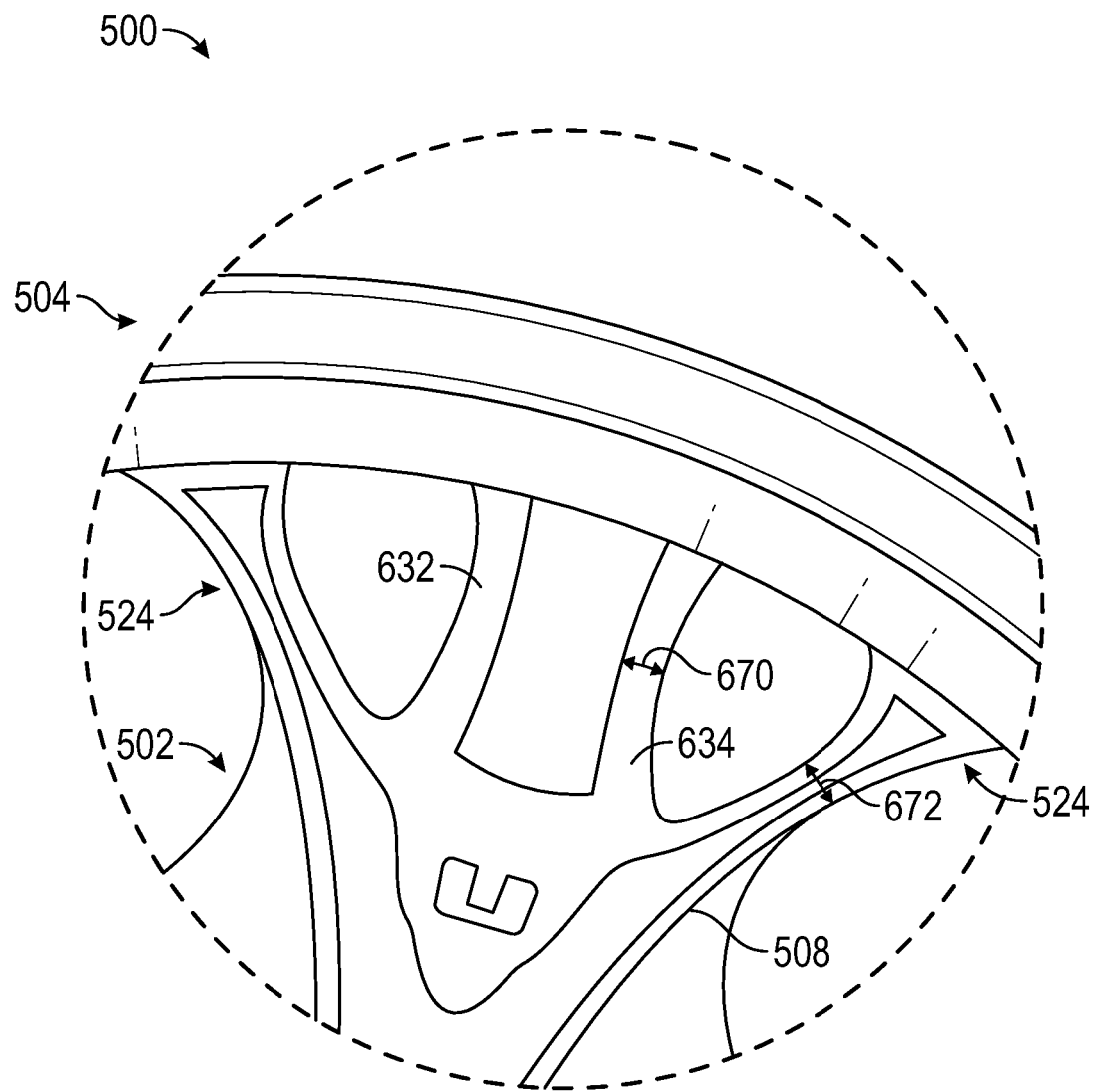
FIG. 10A is an enlarged portion of FIG. 10 showing a rim junction.
Figure 11:
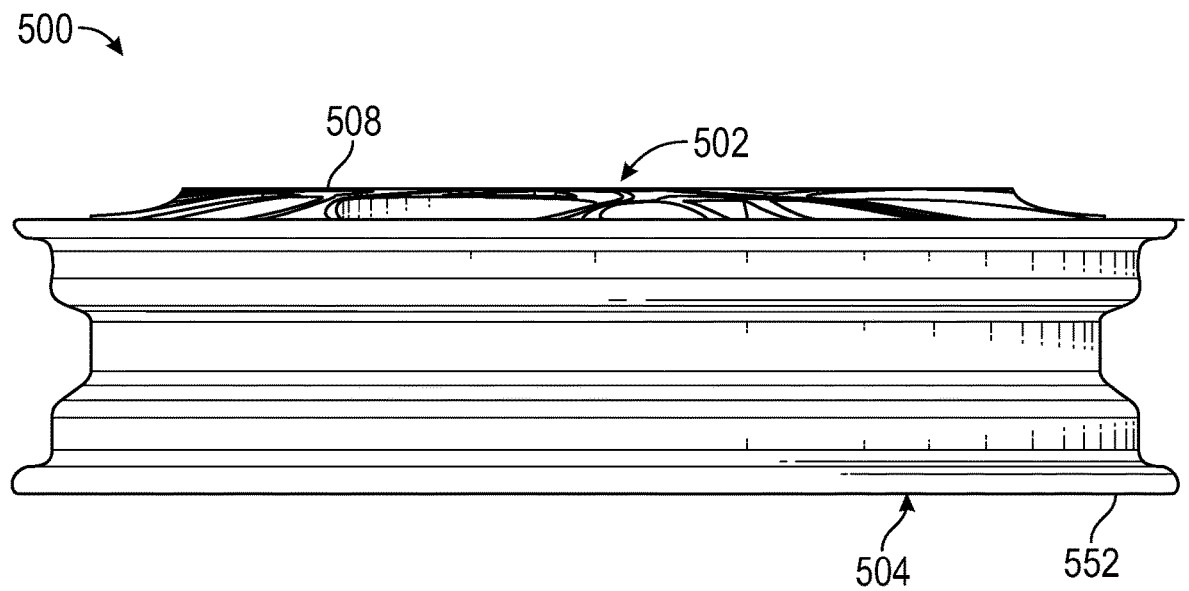
FIG. 11 is an additional elevation view of the vehicle wheel of FIG. 10.
Figure 12:
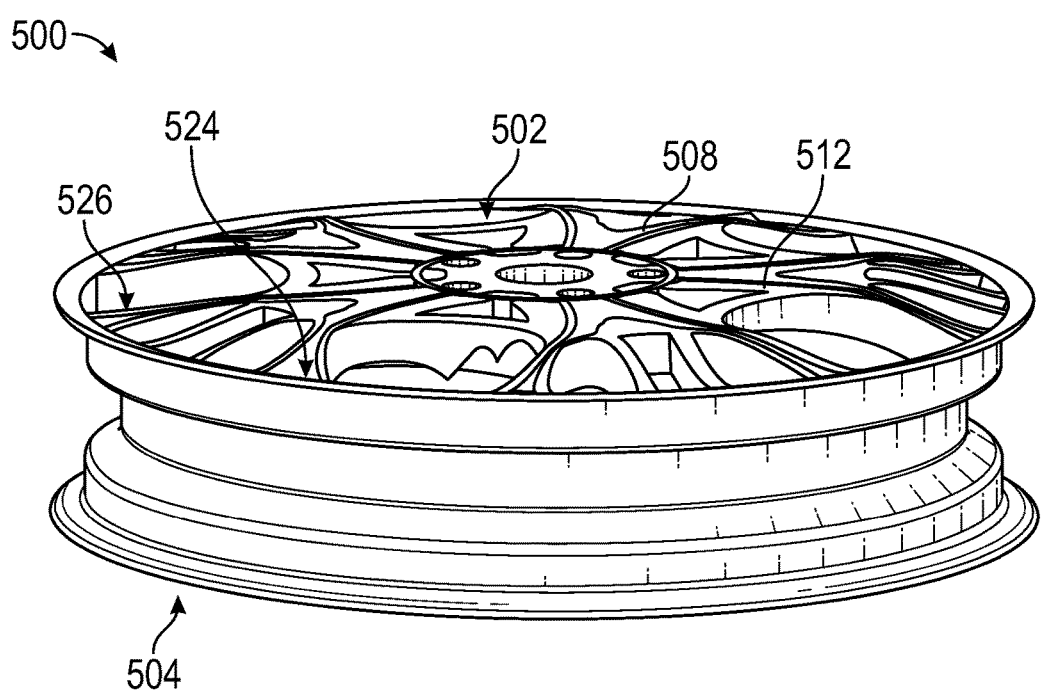
FIG. 12 is a perspective view of the vehicle wheel of FIG. 10.

Referring now to FIGS. 10-12, there is illustrated a third embodiment of a vehicle wheel, indicated generally at 500. Because the vehicle wheel 500 is a variation of the vehicle wheel 300 of FIGS. 8 and 9, like reference numerals, increased by 200, designate corresponding parts in the drawings and detailed description thereof will be omitted.

As illustrated, first and second forks 632 and 634 are other than parallel between spokes 508 and a wheel rim 504. As illustrated, from the spokes 508 to the wheel rim 504, first and second forks 632 and 634, respectively, initially converge before subsequently diverging. Furthermore, first widths 670 of the first and second forks 632 and 634, respectively, initially decrease and then subsequently increase from the spokes 508 to the wheel rim 504, wherein the first widths 670 are in a circumferential direction 526 544. Preferably, the first widths 670 are comprised within the range that varies between 5 millimeters to 20 millimeters. More preferably, the first widths 670 are comprised within the range that varies between 5 millimeters to 15 millimeters. Alternatively, the first widths 670 may be other than initially decreasing and then subsequently increasing from the spokes 508 to the wheel rim 504. As non-limiting examples, the first widths 670 may be constant from the spokes 508 to the wheel rim 504.

Second and third portions 524 and 526, respectively, are not bifurcated. Second widths 672 of the second and third portions 524 and 526, respectively, increase from the spokes 508 to the wheel rim 504, wherein the second widths 672 are in the circumferential direction 544. Preferably, the second widths 672 are comprised within the range that varies between 5 millimeters to 30 millimeters. More preferably, the second widths 672 are comprised within the range that varies between 5 millimeters to 15 millimeters. Alternatively, the second widths 672 may be other than increasing from the spokes 508 to the wheel rim 504. As non-limiting examples, the second widths 672 may be constant, decreasing from the spokes 508 to the wheel rim 504, or otherwise varying.

Figure 13:
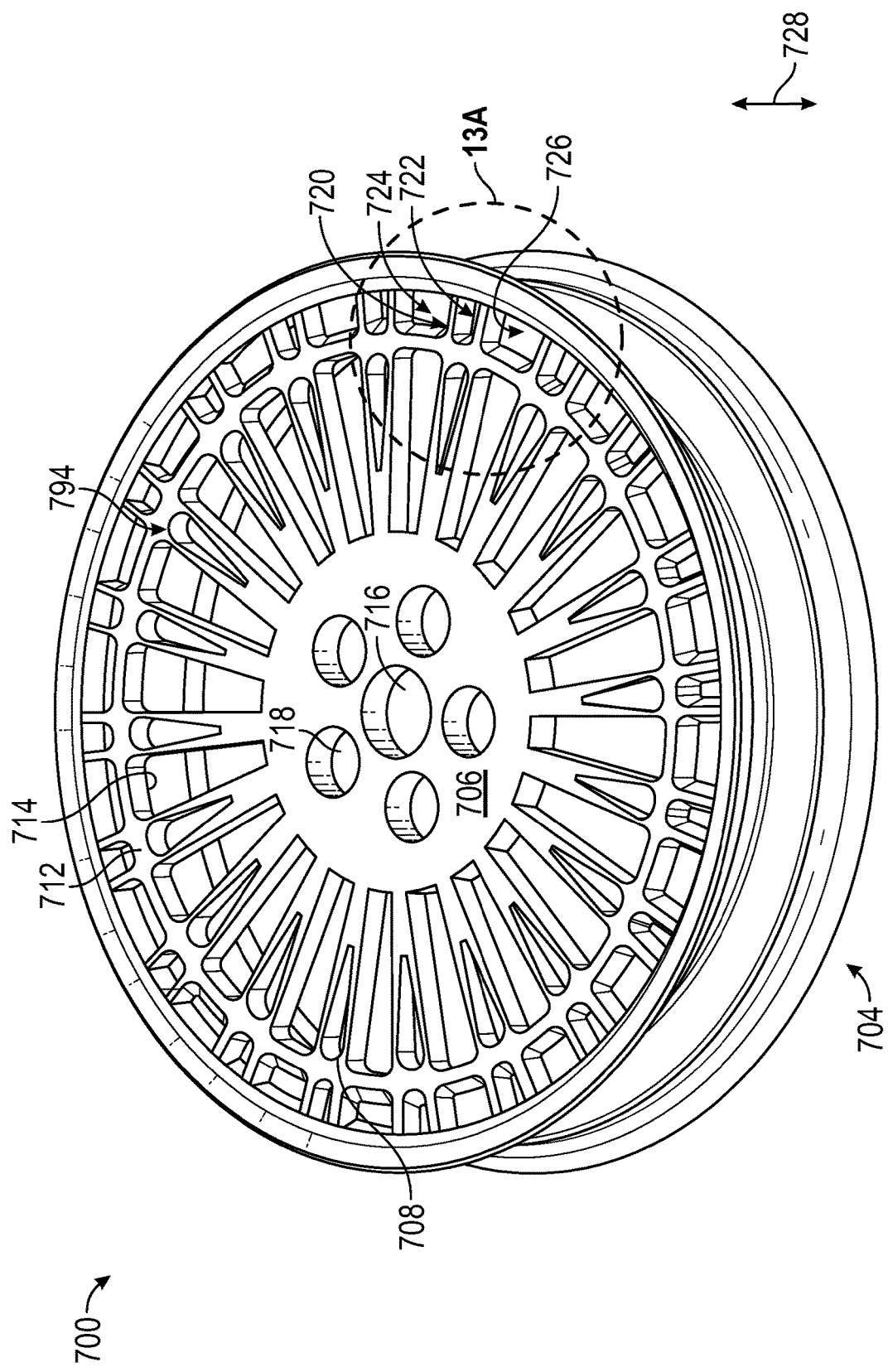
FIG. 13 is a perspective view of a fourth embodiment of a vehicle wheel and wheel disc in accordance with the present invention.
Figure 14:
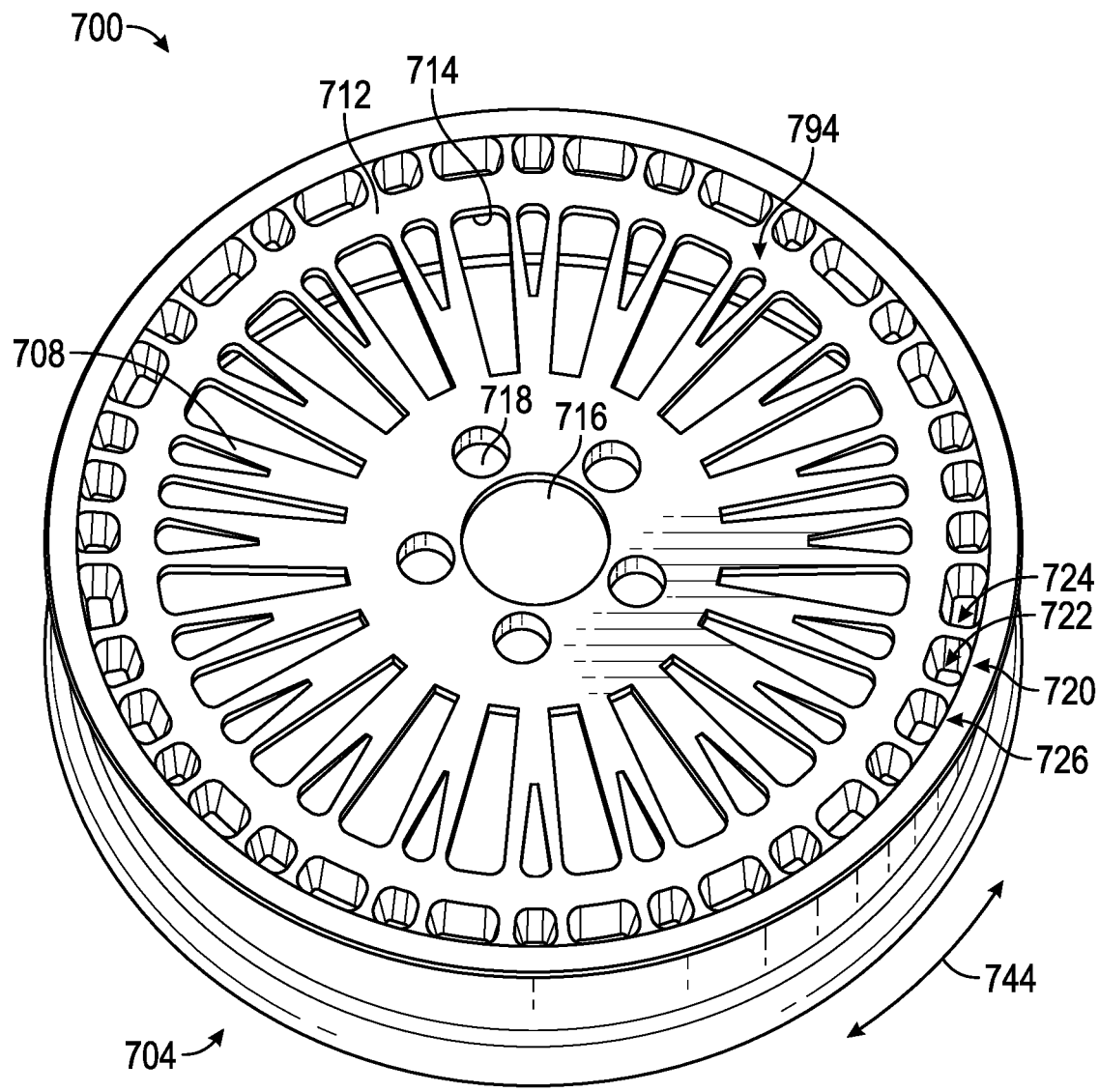
FIG. 14 is an additional perspective view of the vehicle wheel of FIG. 13.

Referring now to FIGS. 13 and 14, there is illustrated a fourth embodiment of a vehicle wheel, indicated generally at 700. Because the vehicle wheel 700 is a variation of the vehicle wheel 100 of FIGS. 1-7, like reference numerals, increased by 600, designate corresponding parts in the drawings and detailed description thereof will be omitted.

The vehicle wheel 700 has rim junctions 720 between spokes 708 and a wheel rim 704. The rim junctions 720 have first portions, indicated generally at 722, second portions 724, and third portions 726 connecting each of the spokes 708 to the wheel rim 704.

As illustrated, the first portions 722 are bifurcated into first and second forks 874 and 876, respectively. Alternatively, the first portions 722 may not be bifurcated. The first and second forks 874 and 876, respectively, are substantially parallel. Alternatively, the first and second forks 874 and 876, respectively, may converge and/or diverge between the spokes 708 and the wheel rim 704.

The first and second forks 874 and 876, respectively, are separated by a distance 878 such that there are first portion recesses 880 between the first and second forks 874 and 876, respectively. Preferably, the distance 878 is comprised within the range from 5 millimeters to 40 millimeters. More preferably, the distance 878 is comprised within the range from 5 millimeters to 30 millimeters. As illustrated, the first portion recesses 880 are centered in a circumferential direction 744 on the spoke centerlines 732. Alternatively, the first portion recesses 880 may be other than centered in the circumferential direction 744 on the centerlines 732. Alternatively, the first portion recesses 880 may be omitted.

The first forks 874 have first thicknesses 882 and the second forks 876 has second thicknesses 884, both in the circumferential direction 744. Preferably, the first and second thicknesses 882 and 884, respectively, are equal. Alternatively, the first thicknesses 882 may be greater or less than the second thicknesses 884. Preferably, the first thicknesses 882 are comprised within the range from 5 millimeters to 20 millimeters. More preferably, the first thicknesses 882 are comprised within the range from 5 millimeters to 15 millimeters. Each of the first and second forks 874 and 876, respectively, may have the same first and second thicknesses 882 and 884, respectively. Alternatively, one or more of the first or second forks 874 or 876 may have a different first or second thickness 882 or 884, respectively.

As illustrated, the first and second thicknesses 882 and 884, respectively, are substantially constant between the spokes 708 and the wheel rim 704. Alternatively, one or both of the first and second thicknesses 882 and 884, respectively, may vary between the spokes 708 and the wheel rim 704.

The first portion 722 extends substantially more in the axial direction 728 than in the circumferential direction 744. As non-limiting examples, the first and second forks 874 and 876, respectively, provide additional stiffness in the axial direction 728 between the spokes 708 and the wheel rim 704.

Figure 13A:
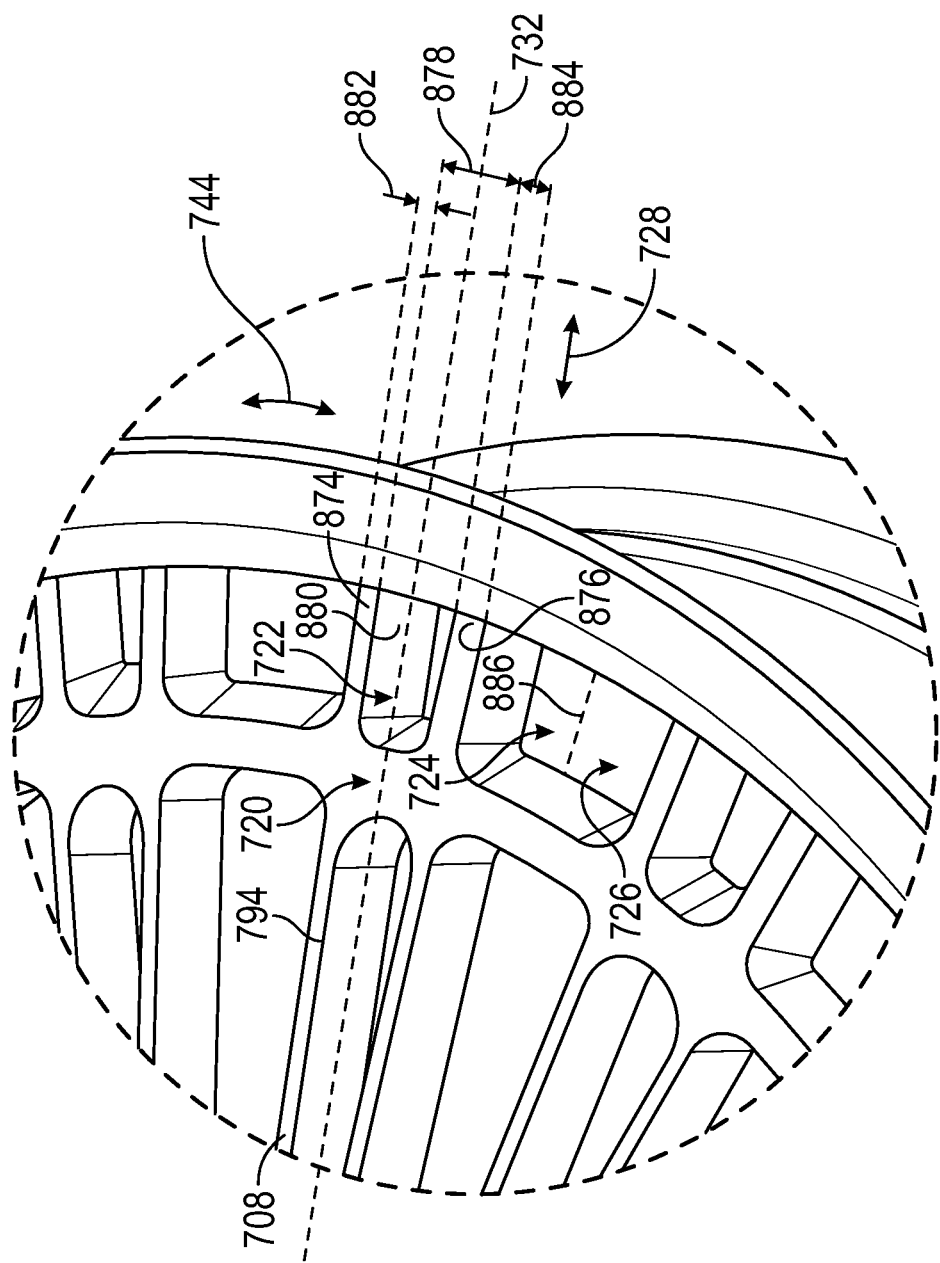
FIG. 13A is an enlarged portion of FIG. 13 showing a rim junction.

The second portions 724 are joined to the third portions 726 of adjoining spokes 708, and vice versa. The second and third portions 724 and 726, respectively, join together at a midpoint 886 (indicated by a dashed line in FIG. 13A). As such, the second and third portions 724 and 726, respectively, form a continuous member between adjoining spokes 708.

The spokes 708 have spoke pockets 794. As illustrated, the spoke pockets 794 are openings that penetrate through the spokes 708 between an outboard 712 and an inboard face 714. Alternatively, the spoke pockets 794 may be only recesses that do not penetrate through the spokes 708.

The principle and mode of operation of this invention have been described in its various embodiments. However, it should be noted that this invention may be practiced otherwise than as specifically illustrated and described without departing from its scope.

What is claimed is:

1. A wheel disc comprising:
   a wheel mounting portion defining wheel axis;
   a plurality of spokes radially extending from the wheel mounting portion;
   a rim junction on at least one spoke of the plurality of spokes, wherein the rim junction is at an end of the at least one spoke opposite the wheel mounting portion;
   a first portion of the rim junction extending in an axial direction; and
   second and third portions of the rim junction extending in a circumferential direction;
   wherein the axial direction is parallel to the wheel axis and the circumferential direction is in a plane perpendicular to the wheel axis;
   further comprising:
   a first thickness of the first portion in the circumferential direction;
   a height of the first portion in the axial direction, wherein the height is greater than the first thickness;
   lengths of the second and third portions in the circumferential direction; and
   second thicknesses of the second and third portions in the axial direction, wherein the lengths are greater than the second thicknesses.

2. The wheel disc of claim 1 wherein the wheel disc is configured to be secured to a wheel rim by producing the wheel rim and the wheel disc by a casting process to produce a one piece cast aluminum vehicle wheel or secured to a separately formed wheel rim to produce a fabricated vehicle wheel, wherein the wheel disc and the wheel rim of the fabricated vehicle wheel are formed of similar or dissimilar materials.

3. The wheel disc of claim 1 further comprising:
   a first angle between the first portion and the second portion; and
   a second angle between the first portion and the third portion.

4. The wheel disc of claim 1 wherein the rim junction secures the wheel disc to a wheel rim.

5. The wheel disc of claim 4 further comprising:
   a rim offset distance between an outboard edge of the wheel rim and a furthest extent of the wheel disc from the wheel rim.

6. The wheel disc of claim 1 further comprising:
   bridge junctions spanning between adjacent spokes of the plurality of spokes.

7. The wheel disc of claim 1 further comprising:
   a plurality of circumferentially spaced lug bolt receiving holes in the wheel mounting portion;
   at least one hub pocket in the wheel mounting portion, wherein the at least one hub pocket extends in the axial direction into the wheel mounting portion from an inboard face of the wheel disc and is interspaced between two lug bolt receiving holes of the plurality of lug bolt receiving holes;
   a bottom wall of the at least one hub pocket; and
   an inner ring of the wheel mounting portion, wherein the inner ring, bottom wall, and two lug bolt receiving holes define the at least one hub pocket.

8. The wheel disc of claim 7 further comprising:
   a sidewall of the at least one hub pocket between the two lug bolt receiving holes, wherein the sidewall extends in the axial direction, is a radially outward extent of the wheel mounting portion, and further defines the at least one hub pocket; and
   an opening provided in the sidewall of the at least one hub pocket.

9. The wheel disc of claim 7 further comprising:
   an outer ring tangentially connecting the plurality of lug bolt receiving holes, wherein the outer ring further defines the at least one hub pocket.

10. A wheel disc comprising:
    a wheel mounting portion defining wheel axis;
    a plurality of spokes radially extending from the wheel mounting portion;
    a rim junction on at least one spoke of the plurality of spokes, wherein the rim junction is at an end of the at least one spoke opposite the wheel mounting portion;
    a first portion of the rim junction extending in an axial direction; and
    second and third portions of the rim junction extending in a circumferential direction;
    wherein the axial direction is parallel to the wheel axis and the circumferential direction is in a plane perpendicular to the wheel axis;
    further comprising:
    a radially extending spoke pocket in the at least one spoke, wherein the spoke pocket has a spoke pocket depth;
    a first end of the spoke pocket, wherein the first end is adjacent the wheel mounting portion; and
    a second end of the spoke pocket, wherein the second end is adjacent the rim junction and the spoke pocket depth decreases between the first and second ends.

11. The wheel disc of claim 1 further comprising:
    a plurality of lug bolt receiving holes in the wheel mounting portion, wherein the plurality of lug bolt receiving holes are circumferentially spaced in the wheel mounting portion;
    at least one nut pocket extending from an outboard face of the wheel disc into the wheel mounting portion to at least one of the lug bolt receiving holes of the plurality of lug bolt receiving holes; and
    a nut pocket sidewall of the at least one nut pocket, wherein the nut pocket sidewall extends in the axial direction.

12. A wheel disc comprising:
    a wheel mounting portion defining wheel axis;
    a plurality of spokes radially extending from the wheel mounting portion;
    a rim junction on at least one spoke of the plurality of spokes, wherein the rim junction is at an end of the at least one spoke opposite the wheel mounting portion;
    a first portion of the rim junction extending in an axial direction; and
    second and third portions of the rim junction extending in a circumferential direction;
    wherein the axial direction is parallel to the wheel axis and the circumferential direction is in a plane perpendicular to the wheel axis;
    further comprising:
    at least one spoke start portion between the wheel mounting portion and the at least one spoke, wherein the spoke start portion has a spoke start height in the axial direction that is greater than a spoke height of the at least one spoke.

13. The wheel disc of claim 1 further comprising:
an outboard face of the wheel disc;
an inboard face of the wheel disc, wherein the inboard face is opposite the outboard face;
a pilot aperture in the wheel mounting portion; and
a plurality of lug bolt receiving holes in the wheel mounting portion, wherein the plurality of lug bolt receiving holes are circumferentially spaced around the pilot aperture.

14. A vehicle wheel comprising:
a wheel rim formed from a suitable material;
a wheel disc formed from a suitable material and configured to be secured to the wheel rim, wherein the wheel disc has a wheel mounting portion defining a wheel axis;
a plurality of spokes radially extending from the wheel mounting portion to the wheel rim;
a rim junction between at least one spoke of the plurality of spokes and the wheel rim;
a first portion of the rim junction extending in an axial direction; and
second and third portions of the rim junction extending in a circumferential direction, wherein the axial direction is parallel to the wheel axis and the circumferential direction is in a plane perpendicular to the wheel axis;
a radially extending spoke pocket in the at least one spoke, wherein the spoke pocket has a spoke pocket depth;
a first end of the spoke pocket, wherein the first end is adjacent the wheel mounting portion; and
a second end of the spoke pocket, wherein the second end is adjacent the rim junction and the spoke pocket depth decreases between the first and second ends.

15. The wheel disc of claim 14 further comprising:
a first region of the spoke pocket in which the spoke pocket depth is constant; and
a second region of the spoke pocket in which the spoke pocket depth is decreasing.

16. The vehicle wheel of claim 14 further comprising:
a spoke pocket length of the spoke pocket, wherein the spoke pocket length is greater than the spoke pocket depth.

17. The vehicle wheel of claim 14 further comprising:
an outboard face of the wheel disc, wherein the spoke pocket extends from the outboard face into the at least one spoke.

* * * * *